United States Patent [19]
Hashimoto

[11] Patent Number: 5,889,526
[45] Date of Patent: Mar. 30, 1999

[54] INTERPOLATION APPARATUS AND METHOD, AND IMAGE GENERATION APPARATUS INCLUDING SUCH AN APPARATUS

[75] Inventor: Tsutomu Hashimoto, Moriguchi, Japan

[73] Assignee: Matsushita Electric Industrial Co., Ltd., Kadoma, Japan

[21] Appl. No.: 561,450

[22] Filed: Nov. 21, 1995

[30] Foreign Application Priority Data

Nov. 25, 1994 [JP] Japan ................................. 6-291043

[51] Int. Cl.⁶ ............................................. G06T 11/00
[52] U.S. Cl. ............................................................ 345/430
[58] Field of Search ................................... 395/130, 131, 395/519, 520; 345/430, 431, 519, 520

[56] References Cited

U.S. PATENT DOCUMENTS

| | | | |
|---|---|---|---|
| 4,615,013 | 9/1986 | Yan et al. | 395/130 |
| 5,029,225 | 7/1991 | Ueda | 345/136 X |
| 5,214,753 | 5/1993 | Lee et al. | 395/125 |
| 5,224,208 | 6/1993 | Miller, Jr. et al. | 395/125 |
| 5,230,039 | 7/1993 | Grossman et al. | 395/130 |
| 5,299,300 | 3/1994 | Femal et al. | 395/128 |
| 5,361,386 | 11/1994 | Watkins et al. | 395/130 |
| 5,548,709 | 8/1996 | Hannah et al. | 395/164 |
| 5,751,292 | 5/1998 | Emmot | 345/430 |

FOREIGN PATENT DOCUMENTS 5342095  12/1993  Japan .

OTHER PUBLICATIONS 5.5. Comparison of Interpolation Methods, pp. 147–149 Wolberg, Digital Image Warping, IEEE Computer Soc. Press. (1993).

*Primary Examiner*—Joseph H. Feild
*Attorney, Agent, or Firm*—Renner, Otto, Boisselle & Sklar, P.L.L.

[57] ABSTRACT

An interpolation apparatus includes a first storage section for storing a texture including a plurality of pixels; an information supply section for supplying information concerning a prescribed number of pixels included in the texture regardless of the position of a reference point with respect to the texture; and an interpolator for performing interpolation by calculating interpolation pixel data based on the information concerning the prescribed number of pixels.

16 Claims, 16 Drawing Sheets

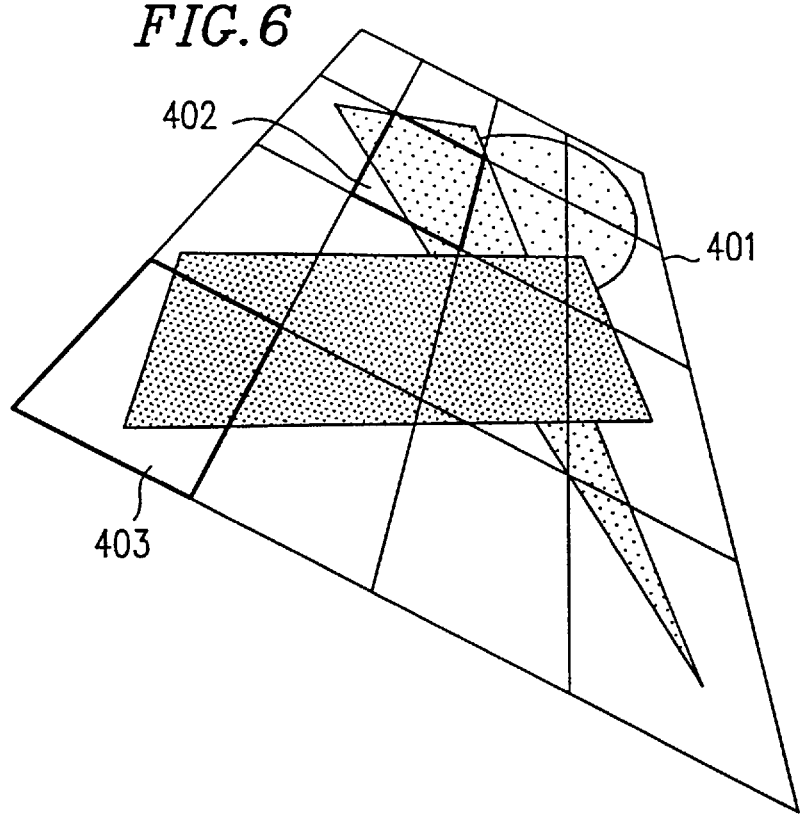

FIG.10

|   | 1 | 2 | 3 | 4 | 5 | 6 | |
|---|---|---|---|---|---|---|---|
| 0 | | | | | | | → u1 |
| | T0[0][0] | T0[0][0] | T0[1][0] | T0[2][0] | T0[3][0] | T0[3][0] | |
| 1 | | | | | | | |
| | T0[0][0] | T0[0][0] | T0[1][0] | T0[2][0] | T0[3][0] | T0[3][0] | |
| 2 | | | | | | | |
| | T0[0][1] | T0[0][1] | T0[1][1] | T0[2][1] | T0[3][1] | T0[3][1] | |
| 3 | | | | | | | |
| | T0[0][2] | T0[0][2] | T0[1][2] | T0[2][2] | T0[3][2] | T0[3][2] | |
| 4 | | | | | | | |
| | T0[0][3] | T0[0][3] | T0[1][3] | T0[2][3] | T0[3][3] | T0[3][3] | |
| 5 | | | | | | | |
| | T0[0][3] | T0[0][3] | T0[1][3] | T0[2][3] | T0[3][3] | T0[3][3] | |
| 6 | | | | | | | |

↓ v1

FIG.17
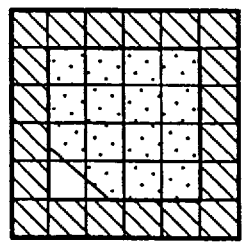 503     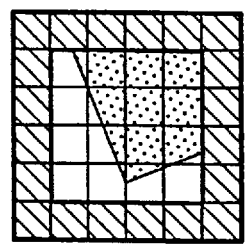 504

5,889,526

INTERPOLATION APPARATUS AND METHOD, AND IMAGE GENERATION APPARATUS INCLUDING SUCH AN APPARATUS

BACKGROUND OF THE INVENTION

1. Field of the Invention

The present invention relates to an apparatus and a method for performing interpolation for obtaining a high quality image in image processing in computer graphics such as texture mapping and image scaling, and to an image generation apparatus including such an interpolation apparatus.

2. Description of the Related Art

Recently, in the field of computer graphics and game machines, texture mapping is often used for polygon rendering. By a method of texture mapping which is generally referred to as "inverse map", coordinates (u, v) of a texture pattern are found by computation from coordinates (Xs, Ys) of the screen. Then, a color corresponding to the coordinates (u, v) is obtained. While the coordinates (u, v) found by computation have a decimal part, the actual texture pattern is defined only by a definite number of points in a lattice, the coordinate (u, v) of which are integers. By making the coordinates (u, v) having decimal parts merely proximate integers, a clear image cannot be generated because of the influence of folding distortion or the like. The quality of the image depends on the method of interpolation of texture information between the points in the lattice. High quality images are obtained by interpolating texture information in texture mapping.

Interpolation in the present context is a process of finding, by calculation, the pixel value of a sample point (non integer) using the values of pixels located in the vicinity of the sample point. The "pixels located in the vicinity of the sample point" are considered pixels located in a circle which has the sampling point as the center and has a radius corresponding to one pixel. There are several methods for performing such interpolation. One such known method for generating a high quality image is, for example, a bilinear interpolation method (see George Wolberg, "Digital Image Warping" published by the IEEE Computer Society Press, 1990, pp. 147–149).

Since conventional texture patterns have a relatively large size, a method of handling pixel data in the boundary area of the texture pattern is not considered.

SUMMARY OF THE INVENTION

In one aspect of the present invention, an interpolation apparatus includes a first storage device for storing a texture including a plurality of pixels; an information supply section for supplying information concerning a prescribed number of pixels included in the texture regardless of the position of a reference point with respect to the texture; and an interpolator for performing interpolation by calculating interpolation pixel data based on the information concerning the prescribed number of pixels.

In another aspect of the present invention, an interpolation method includes the steps of supplying information concerning a prescribed number of pixels included in a texture including a plurality of pixels regardless of the position of a reference address with respect to the texture; and performing interpolation by calculating interpolation pixel data based on the information concerning the prescribed number of pixels.

In still another aspect of the present invention, an image generation apparatus for generating an image by mapping a texture to a polygon includes a storage device for storing a texture including a plurality of pixels; a converter for converting coordinates of a point on a polygon plane to coordinates of a point on a texture plane; an information supply section for supplying information concerning a prescribed number of pixels included in the texture, regardless of the values of the coordinates of the point on the texture plane; an interpolator for performing interpolation by calculating interpolation pixel data based on the information concerning the prescribed number of pixels; and a generator for generating an image based on the interpolation pixel data.

Thus, the invention described herein makes possible the advantage of providing an apparatus and a method for performing interpolation which realizes high-speed access to the texture and generates high-quality images, and an image generation apparatus including such an interpolation apparatus.

These and other advantages of the present invention will become apparent to those skilled in the art upon reading and understanding the following detailed description with reference to the accompanying figures.

BRIEF DESCRIPTION OF THE DRAWINGS

FIG. 6 is a view illustrating an example of a polygon generated by a generated image storing section of the system shown in FIG. 1;

FIG. 10 is a view illustrating an example of a texture after division stored in the second original image storing section;

FIG. 17 is a view illustrating an example of textures to be stored in the second original image storing section;

DESCRIPTION OF THE PREFERRED EMBODIMENTS

Hereinafter, the present invention will be described by way of illustrative examples with reference to the accompanying drawings.

Example 1

Figure 1:
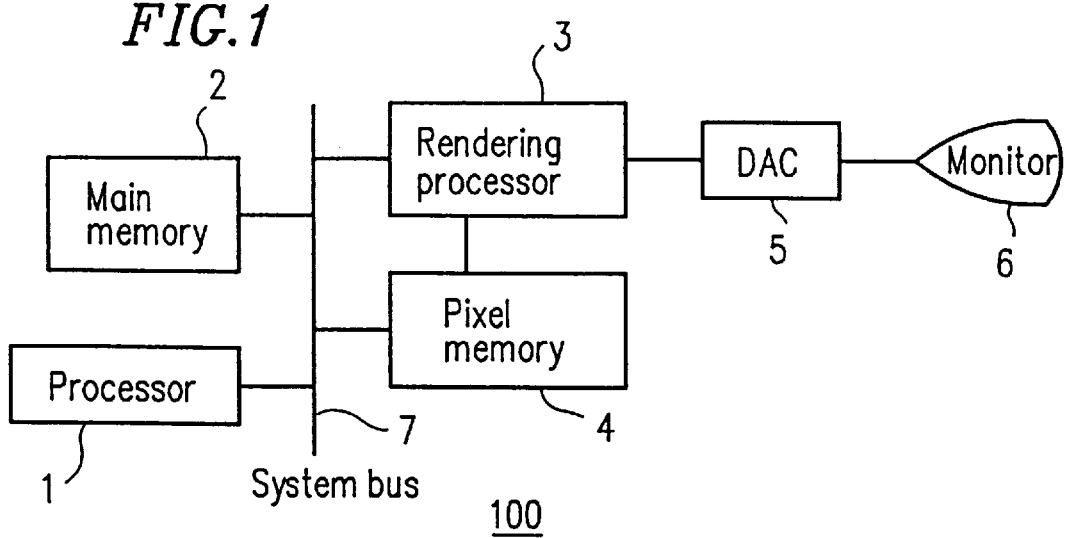
FIG. 1 is a block diagram illustrating a structure of a system for drawing a polygon by texture mapping.

FIG. 1 shows a structure of a system 100 for drawing a polygon by texture mapping. The system 100 includes a processor 1, a main memory 2, a rendering processor 3, a pixel memory 4, a digital-analog converter (DAC) 5, a monitor 6, and a system bus 7. The processor 1, the main memory 2, the rendering processor 3, and the pixel memory 4 are connected to the system bus 7. An input/output device (not shown) is also connected to the system bus 7.

The processor 1 performs geometric operations for processing three-dimensional graphics, and controls the operation of the rendering processor 3 and the DAC 5, and the operation of the entire system 100.

The main memory 2 stores a program executed by the processor 1 and data required for performing processing such as non-transparency processing and texture mapping. Polygon data is included in such data.

The rendering processor 3 generates an image representing a polygon by computing pixel data indicating the color of each of pixels of an image stored in the pixel memory 4. The image generated by the rendering processor 3 is also stored in the pixel memory 4. By such a structure, the polygon is drawn by the rendering processor 3. The operation of the rendering processor 3 is controlled by the processor 1.

The pixel memory 4 stores the image to be drawn by the rendering processor 3 and an original image (texture) used for computing the pixel data of the image.

The image generated by the rendering processor 3 is output to the monitor 6 through the DAC 5. Thus, the image representing the polygon is displayed on the monitor 6.

Figure 2:
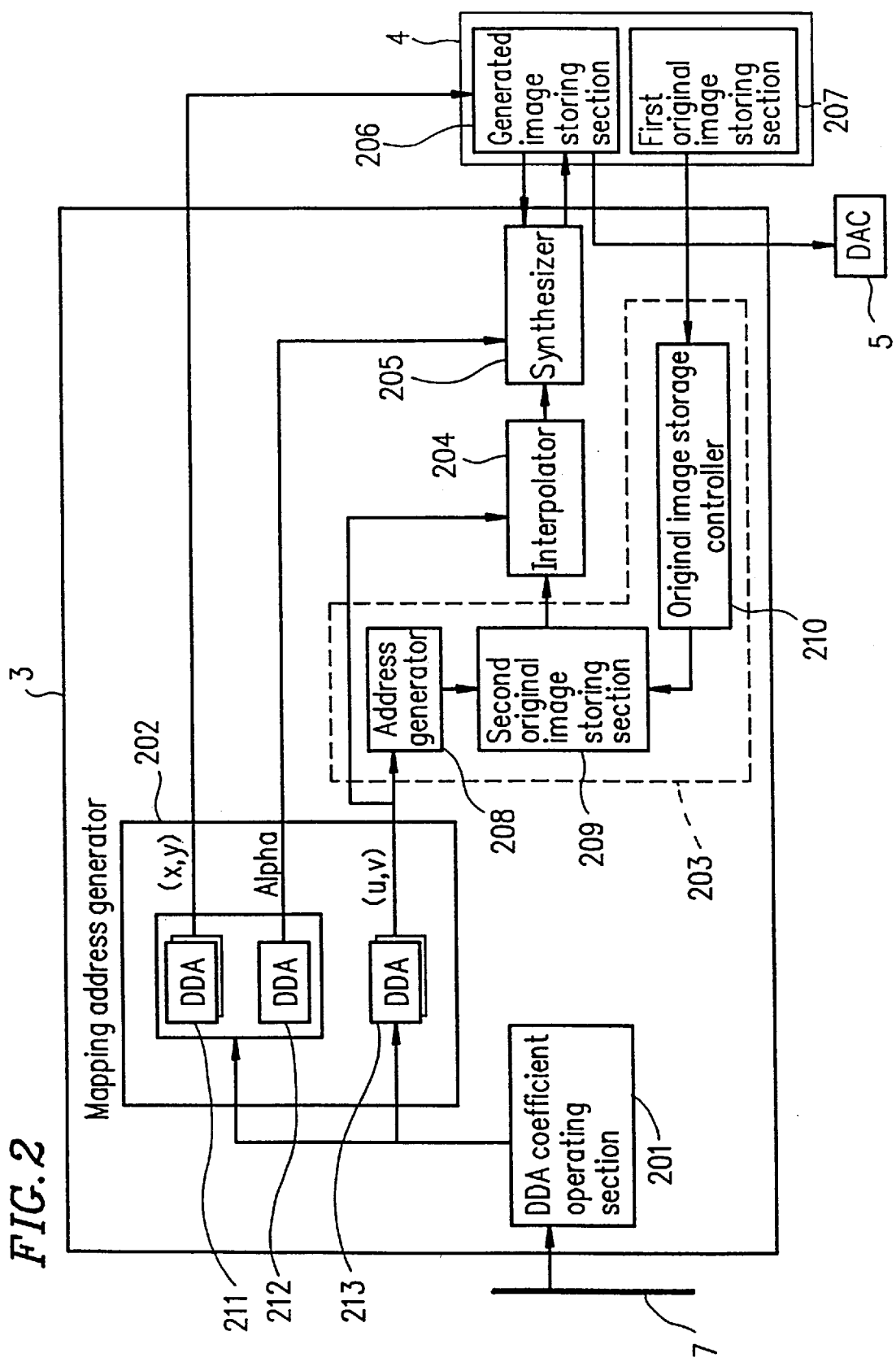
FIG. 2 is a block diagram illustrating a structure of a rendering processor of the system shown in FIG. 1.

FIG. 2 shows a structure of the rendering processor 3 and the pixel memory 4. The rendering processor 3 includes a DDA (digital differential analyzer) coefficient operating section 201, a mapping address. generator 202, a pixel value supplier 203, an interpolator 204, and a synthesizer 205. The pixel memory 4 includes a generated image storing section 206 for storing an image generated by the rendering processor 3 and a first original image storing section 207 for storing an original image (texture) used for generating the image.

The DDA coefficient operating section 201 is supplied through the system bus 7 with the relationship between coordinates (x, y, z) of a vertex of the polygon represented by an xyz coordinate system and coordinates (u, v) of a vertex of the texture represented by a uv coordinate system. The relationship is supplied in the form of, for example, functions of u=f(x, y) and v=g(x, y). Based on such relationship, the DDA coefficient operating section 201 generates a DDA coefficient. The DDA coefficient includes a differential coefficient in a y direction (du/dy, dv/dy) and a partial differential coefficient in an x direction ($\partial u/\partial x$, $\partial v/\partial x$). The DDA coefficient thus generated is supplied to the mapping address generator 202.

The mapping address generator 202 includes an xy-DDA processing section 211 for generating coordinates (x, y) of the polygon, an alpha-DDA processing section 212 for generating an attribute value of the polygon, and a uv-DDA processing section 213 for generating coordinates (u, v) of a texture corresponding to the coordinates (x, y) of the polygon. The coordinates of the polygon, the attribute value, and the coordinates of the texture are generated based on the DDA coefficient. The attribute value of the polygon generated by the alpha-DDA processing section 212 can be, for example, the ratio of the area of the polygon with respect to the area of one pixel, namely, the area contribution ratio.

In more detail, the DDA processing by the mapping address generator 202 is performed based on the differential coefficient in the y direction, the partial differential coefficient in the x direction, and an initial value (coordinates of the vertex of the polygon). For example, the uv-DDA processing section 213 generates the coordinates (u, v) of a reference point with respect to the texture stored in the first original image storing section 207 based on the differential coefficient in the y direction, the partial differential coefficient in the x direction, and the initial value. The coordinates (u, v) of a reference point with respect to the texture is generated in the following manner.

The coordinates of a reference point with respect to the texture corresponding to an edge of the polygon is found by applying the recurrence formula presented below as equation (1) for each of a plurality of scanned lines. In equation (1), the point represented by (u(n+1), v(n+1)) is on a line immediately below the line on which the point is represented by (u(n), v(n)).

$$(u(n+1), v(n+1)) = (u(n), v(n)) + (du/dy, dv/dy) \quad (1)$$

The coordinates of a reference point with respect to the texture corresponding to points which are on the same scan line within the polygon (such scan line is referred to as a span) are found using the recurrence formula presented below as equation (2). In equation (2), the point represented by (u(n+1), v(n+1)) is adjacent to the point represented by (u(n), v(n)) in the span direction by one pixel.

$$(u(n+1), v(n+1)) = (u(n), v(n)) + (\partial u/\partial x, \partial v/\partial x) \quad (2)$$

The pixel value supplier 203 supplies coordinates and values of a prescribed number of pixels to the interpolator 204, regardless of the values of the coordinates of the reference point with respect to the texture generated by the uv-DDA processing section 213.

To the interpolator 204, the coordinates (u, v) generated by the uv-DDA processing section 213 are supplied as a reference address. To the interpolator 204, coordinates and values of a prescribed number of pixels from the pixel value supplier 203 are also supplied via the second original image storing section 209 as discussed below. The interpolator 204 computes a value of interpolation pixel data (P_gen) by weighting each of the values of the prescribed number of pixels. Such processing is referred to as "bilinear processing".

Figure 3:
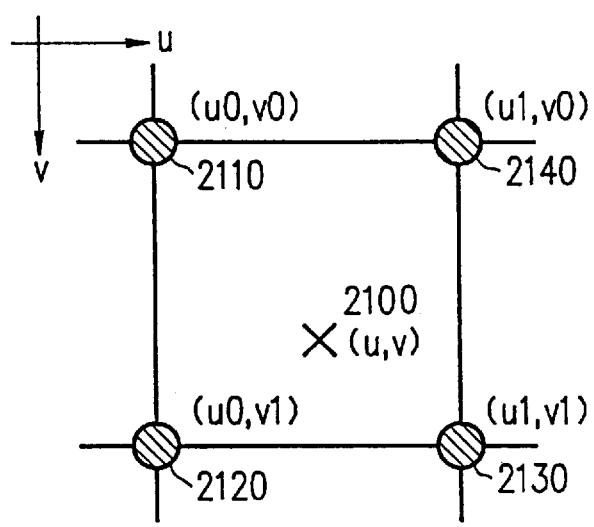
FIG. 3 is a view illustrating an arrangement of a reference address and pixels located in the vicinity of the reference address.

FIG. 3 shows an arrangement of four pixels 2110 through 2140 located in the vicinity of a reference address 2100 (u, v). In this case, the pixel value supplier 203 (FIG. 2) supplies the interpolator 204 with the coordinates and the values of each of the pixels 2110 through 2140 which are located in the vicinity of the reference address 2100 (u, v). In this specification, "in the vicinity of the reference address (u, v)" means "within a circle having the reference address as the center and having a radius corresponding to one pixel". The interpolator 204 calculates the value of the interpolation pixel data (P_gen) using equation (3).

$$P\_gen=(u1-u)\times(v1-v)\times a+(u1-u)\times(v-v0)\times b+(u-u0)\times(v-v0)\times c+(u-u0)\times(v1-v)\times d \qquad (3)$$

Herein, the coordinates of the pixel 2110 are (u0, v0) and the value thereof is "a"; the coordinates of the pixel 2120 are (u0, v1) and the value thereof is "b"; the coordinates of the pixel 2130 are (u1, v1) and the value thereof is "c"; and the coordinates of the pixel 2140 are (u1, v0) and the value thereof is "d".

When the reference address 2100 is located in the vicinity of the border of the texture, four pixels do not exist in the vicinity of the reference address in some cases. In this specification, when four pixels do not exist in the vicinity of a reference address, the reference address is in a "boundary region"; and when four pixels exist in the vicinity of a reference address, the reference address is in a "center region".

Figure 4A:
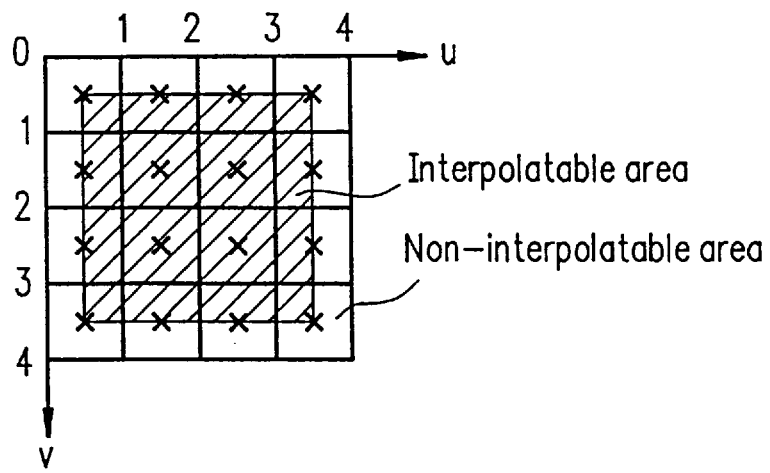
FIGS. 4A and 4B are views illustrating examples of a center region and a boundary region of a texture.

FIG. 4A shows a center region (hatched area) and a boundary region (not hatched) in the case where the sampling point for the pixel value is at the center of the pixel. The center region is expressed by equation (4). In this case, the texture has a size of m x n pixels.

$$0.5 \leq u \leq m-0.5,\ 0.5 \leq v \leq n-0.5 \qquad (4)$$

Figure 4B:
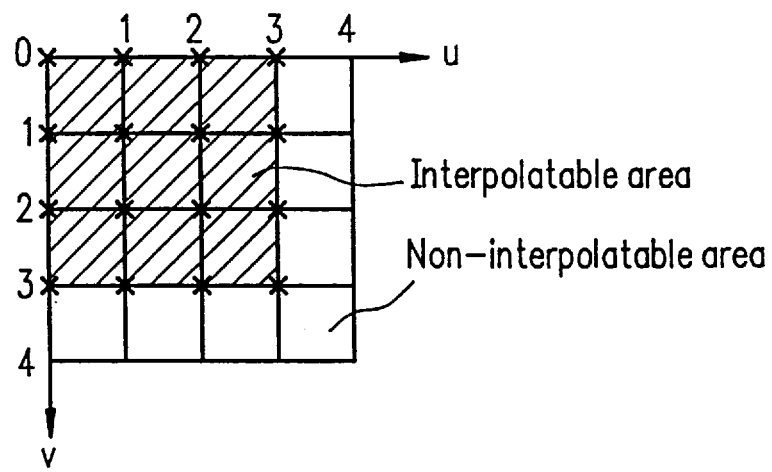

FIG. 4B shows a center region (hatched area) and a boundary region (not hatched) in the case where the sampling point for the pixel value is at the top left point (the point closest to the origin of the coordinate system representing the pixel). The center region is expressed by equation (5). In this case, also, the texture has a size of m×n pixels.

$$0.0 \leq u \leq m-1.0,\ 0.0 \leq v \leq n-1.0 \qquad (5)$$

In FIGS. 4A and 4B, the texture includes 4×4 pixels, and each pixel is represented by a small square.

The pixel value supplier 203 supplies the interpolator 204 with the coordinates and the values of the prescribed number of pixels, regardless of whether the reference address is in the center region or in the boundary region.

Referring back to FIG. 2, the pixel value supplier 203 includes an address generator 208, a second original image storing section 209, and an original image storage controller 210.

The address generator 208 generates an address used for accessing a pixel of the texture which is stored in the second original image storing section 209 in accordance with the coordinates of the reference point with respect to the texture (u, v) generated by the uv-DDA processing section 213.

The second original image storing section 209 partially or totally stores the texture to be rendered which is stored in the first original image storing section 207. The rendering processor 3 can be formed on one chip and the first original image storing section 207 can be formed on another chip. For example, the rendering processor 3 can be formed as a single LSI chip, and the first original image storing section 207 can be implemented as an external memory. In this case, the second original image storing section 209 acts as a cache/buffer of the first original image storing section 207. Accordingly, the second original image storing section 209 preferably operates faster than the first original image storing section 207. In such a structure, the access to the second original image storing section 209 is access within the LSI chip. As a result, high-speed access to the texture is enabled, thus solving the bus bottleneck between the rendering processor 3 (LSI) and the first original image storing section 207 (external memory).

The original image storage controller 210 cuts out at least a part of the texture stored in the first original image storing section 207 and transfers the obtained part of the texture to the second original image storing section 209.

Figure 5A:
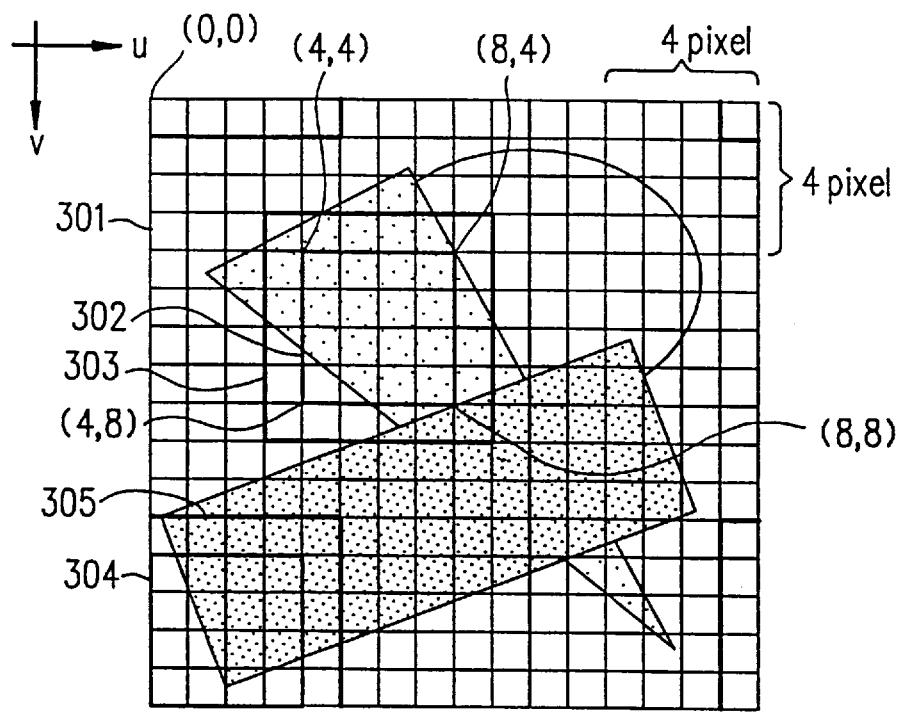
FIG. 5A is a view illustrating an example of a texture 301 stored in a first original image storing section of the system shown in FIG. 1.

FIG. 5A illustrates an example of a texture 301. In this example, the texture 301 includes 16×16 pixels, and the minimum unit for texture mapping is set to be 4×4 pixels. The texture 301 is divided into 16 units each including 4×4 pixels. For example, a texture 302 (FIG. 5B; a part of the texture 301) includes 4×4 pixels surrounded by the coordinates (u, v)=(4, 4), (4, 8), (8, 8), (8, 4). A texture 304 (FIG. 53; a part of the texture 301) includes 4×4 pixels surrounded by the coordinates (u, v)=(0, 12), (0, 16), (4, 16), (4, 12). The minimum unit for texture mapping is determined in accordance with the size of the texture which can be stored in the second original image storing section 209. The following description is based on the assumption that the size of the texture which can be stored in the second original image storing section 209 is 6×6 pixels, which is larger than the 4×4 pixel texture by one pixel along each of the four sides thereof.

FIG. 6 illustrates an example of a polygon 401 stored in the generated image storing section 206. To the polygon 401, the texture 301 (FIG. 5A) is mapped. The polygon 401 is also divided into 16 polygons. A polygon 402 (a part of the polygon 401) corresponds to the texture 302, and a polygon 403 (a part of the polygon 401) corresponds to the texture 304.

The original image storage controller 210 cuts out the texture 303 (FIG. 5C) which is larger than the texture 302 by one pixel along each of the four sides thereof from the texture 301 stored in the first original image storing section 207. The original image storage controller 210 then transfers the texture 303 to the second original image storing section 209. The texture 303 includes 6×6 pixels surrounded by the coordinates (u, v)=(3, 3), (3, 9), (9, 9), (9, 3). Cutting out the texture 303 from the texture 301 is one example of processing which is performed by the original image storage controller 210 when the texture 302 does not include a boundary region of the texture 301. Alternatively, a texture which is larger than the texture 302 by two or more pixels along each of the four sides thereof can be cut out from the texture 301.

The original image storage controller 210 also cuts out a texture 305 (FIG. 5C) which is larger than the texture 304 by one pixel along each of the four sides thereof from the texture 301 stored in the first original image storing section 207, and then transfers the texture 305 to the second original image storing section 209. The texture 305 includes four texture parts. A first texture part includes 5×5 pixels surrounded by the coordinates (u, v)=(0, 11), (0, 16), (5, 16), (5, 11). A second texture part includes 5×1 pixels surrounded by the coordinates (u, v)=(15, 11), (15, 16), (16, 16), (16, 11). A third texture part includes 1×5 pixels surrounded by the coordinates (u, v)=(0, 0), (0, 1), (5, 1), (5, 0). A fourth texture part includes one pixel surrounded by the coordinates (u, v)=(15, 0), (15, 1), (16, 1), (16, 0). Such a structure is formed based on the fact that the texture is formed like a torus.

Cutting out the texture 305 from the texture 301 is one example of processing which is performed by the original image storage controller 210 when the texture 304 includes a boundary region of the texture 301. Alternatively, a texture which is larger than the texture 304 by two or more pixels along each of the four sides thereof can be cut out from the texture 301.

Hereinafter, a process for cutting out the textures 303 and 305 from the texture 301 will be described in more detail.

Figure 7:
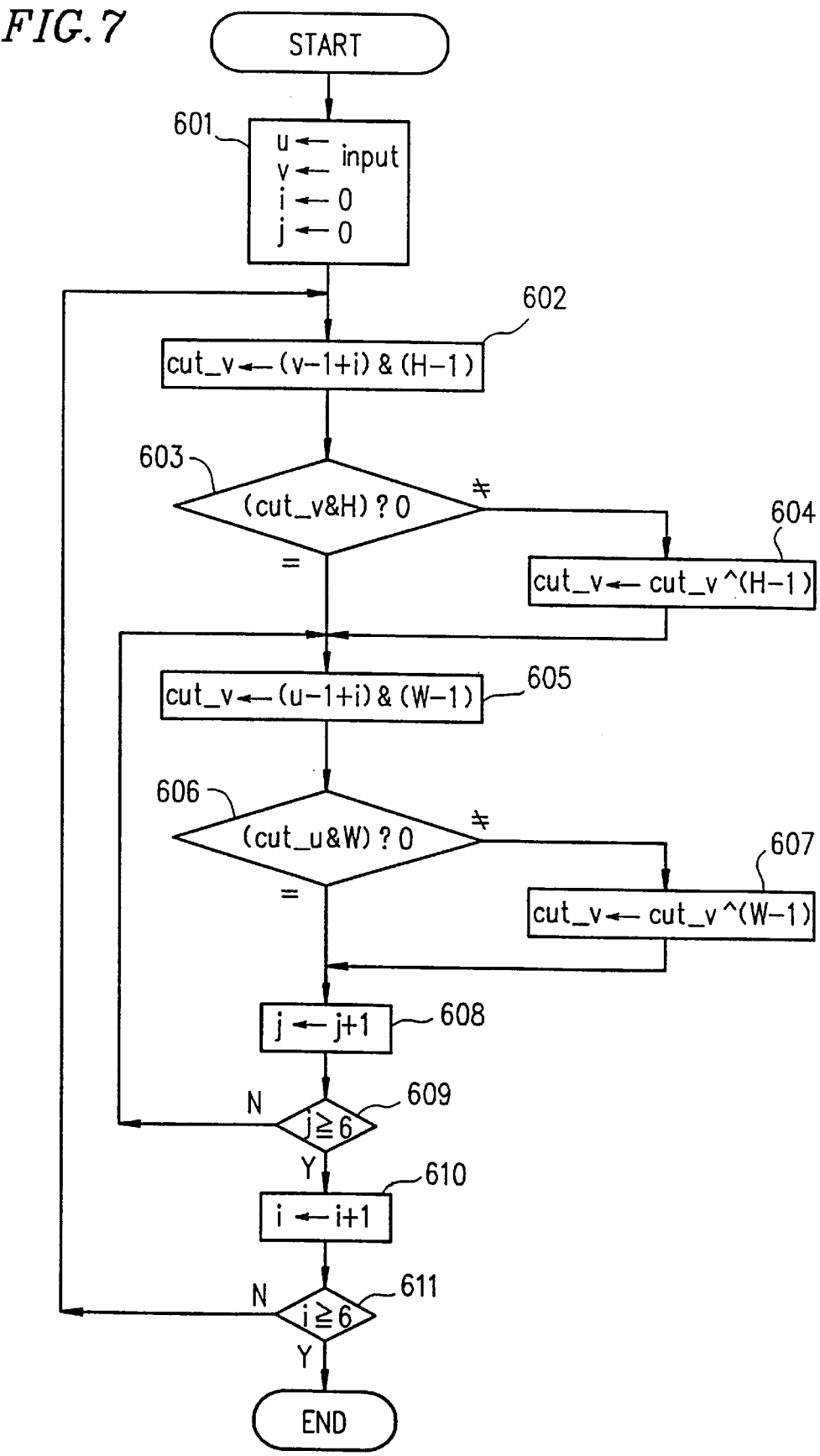
FIG. 7 is a flowchart showing a process for cutting a plurality of textures from one texture by an original image storage controller of the system shown in FIG. 1.

FIG. 7 is a flowchart showing an example of the cutting procedure in the case where the size of a texture 302 (304) resulting from division is 4×4 pixels and the size of a texture to be cut out 303 (305) is 6×6 pixels. This cutting procedure is performed by the original image storage controller 210.

In FIG. 7, coordinates (u, v) represent a point which is closest to the origin of the texture 302 (304). Coordinates (cut_u, cut_v) represent a point which is closest to the origin of the texture 303 (305) to be cut out. Letters H and W respectively represent the height and the width of the texture 301. Here, H and W are each a power of 2. Symbol i represents a built-in counter for counting the number of pixels in a u direction of the texture 303 (305); and symbol j represents a built-in counter for counting the number of pixels in a v direction of the texture 303 (305). Symbol "&" represents an AND operation, and symbol "^" represents an exclusive-OR operation.

In FIG. 7, steps 605 through 609 form one loop. This loop is used for computing the coordinate of the texture 303 (305) in the u direction. Steps 602 through 611 forms another loop. This loop is used for computing the coordinate of the texture 303 (305) in the v direction.

Hereinafter, each step shown in FIG. 7 will be described.

In step 601, coordinates (u, v) are input. The built-in counters i and j are initialized to zero.

In step 602, the coordinate cut_v of the texture 303 (305) along the v axis is computed.

In step 603, whether cut_v obtained in step 602 is in the area Of the texture 301 or not is determined. If so, the procedure advances to step 605. If not, the procedure goes to step 604 and then to step 605.

In step 604, the value of cut_v is changed so that the texture can be formed like a torus.

In step 605, the coordinate cut_u of the texture 303 (305) along the u axis is computed in the same manner as in step 602.

In step 606, whether cut_u obtained in step 605 is in the area of the texture 301 or not is determined. If so, the procedure advances to step 608. If not, the procedure goes to step 607 and then to step 608.

In step 607, the value of cut_u is changed so that the texture can be formed like a torus in the same manner as in step 604.

In step 608, counter j (v direction) is incremented by one.

In stop 609, whether processing in the v direction should be terminated or not is determined.

In step 610, counter i (u direction) is incremented by one.

In step 611, whether processing in the u direction should be terminated or not is determined.

By executing steps 601 through 611, the coordinates (cut_u, cut_v) of the point which is closest to the origin of the texture 303 (305) can be obtained from the coordinates (u, v) of the point which is closest to the origin of the texture 302 (304), in view of the fact that the texture is formed like a torus.

Thus, the original image storage controller 210 cuts out a texture which is, larger than the texture corresponding to the polygon by at least one pixel along each of the four sides thereof, and transfers the obtained texture to the second original image storing section 209. As a result, the second original image storing section 209 can constantly supply the interpolator 204 with four pixels located in the vicinity of the reference address, regardless of whether or not the reference address generated by the address generator 208 is in the area of the texture stored in the second original image storing section 209. In the case where the rendering processor 3 is implemented on a single LSI chip, the access to the texture stored in the second original image storing section 209 is performed at a sufficiently high speed, and thus memory bottleneck can be avoided. Further, the quality of an image generated by dividing a single texture into a plurality of textures and performing texture mapping of each of the plurality of textures is as high as the quality of an image generated by performing texture mapping of a single texture.

Referring back to FIG. 2, to the synthesizer 205 in the rendering processor 3, the interpolation pixel data (P_gen) from the interpolator 204 is supplied and the attribute value (α_gen) of the interpolation pixel data (P_gen) from the alpha-DDA processing section 212 is also supplied. To the synthesizer 205, pixel data (P_acc_in) and the attribute value (α_acc_in) of the pixel data from the generated image storing section 206 is further supplied. Based on such data, the synthesizer 205 generates pixel data (P_acc_out) for the generated image and the attribute value (α_acc_out) of the pixel data. The pixel data (P_acc_out) and the attribute value (α_acc_out) are stored in the generated image storing section 206. Such synthesizing processing, which is referred to as "alpha blending", is a process for mixing the interpolation pixel data supplied by the interpolator 204 and the pixel data stored in the generated image storing section 206 at a prescribed mixture ratio. The prescribed mixture ratio is determined based on the attribute value supplied by the alpha DDA processing section 212 and the attribute value stored in the generated image storing section 206. In a practical operation, the alpha blending is achieved by computing the pixel data (P_acc_out) for the generated image and the attribute value (α_acc_out) of the pixel data using equation (6).

$$
\begin{aligned}
&\text{When } \alpha\_acc\_in > 1.0, \\
&\quad \text{the generated image storing section 207 cannot be accessed,} \\
&\quad (P\_acc\_out = P\_acc\_in, \alpha\_acc\_out = \alpha\_acc\_in) \\
&\text{When } (\alpha\_acc\_in + \alpha\_grn) > 1.0, \\
&\quad P\_acc\_out = P\_acc\_in + (1.0 - \alpha\_acc\_out) \times P\_gen \\
&\quad \alpha\_acc\_out = 1.0 \\
&\text{When } (\alpha\_acc\_in + \alpha\_gen) < 1.0, \\
&\quad P\_acc\_out = P\_acc\_in + \alpha\_gen \times P\_gen \\
&\quad \alpha\_gen\_out = \alpha\_acc\_in + \alpha\_gen
\end{aligned} \quad (6)
$$

where

P_gen: pixel data obtained by interpolation by the interpolator 204,

α_gen: attribute value of the pixel data obtained by interpolation by the interpolator 204, P_acc_in: pixel data input from the generated image storing section 206, α_acc_in: attribute value of the pixel data input from the generated image storing section 206, P_acc_out: pixel data to be stored in the generated image storing section 206, and α_acc_out: attribute value of the pixel data to be stored in the generated image storing section 206.

In this manner, the generated image is stored in the generated image storing section 206.

The generated image storing section 206 for storing the pixel data of the generated image and the attribute value of the pixel data, and the first original image storing section 207 for storing the texture used for rendering can be formed of a general large capacity memory and further can be formed using the same bus. The generated image storing section 206 and the first original image storing section 207 correspond to the pixel memory 4 shown in FIG. 1.

Example 2

Interpolation in a second example according to the present invention will be described. The system 100 and the rendering processor 3 have the same structure as in the first example, and the description thereof will be omitted. The interpolation in the second example is different from that in the first example in the processing performed by the original image storage controller 210.

Figure 8:
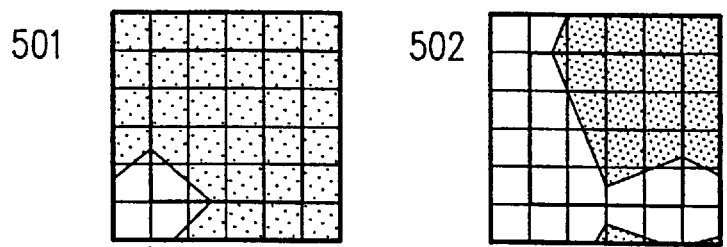
FIG. 8 is a view illustrating an example of the textures obtained by dividing one texture, data of which are to be stored in a second original image storing section of the system shown in FIG. 1.

FIG. 8 illustrates textures 501 and 502 to be stored in the second original image storing section 209. The original image storage controller 210 reads a texture (for example, a 4×4 pixel texture) to be mapped from the first original image storing section 207. Next, the original image storage controller 210 copies pixels located in a boundary region of the obtained texture read out to an area in the vicinity of the boundary region to generate a texture which is larger than the texture read from the first original image storing section 207 by one pixel along each of four sides thereof. Alternatively, the texture generated by the original image storage controller 210 can be larger than the original texture by two or more pixels along each of four sides thereof. The texture generated in this manner is stored in the second original image storing section 209.

The texture 501 having 6×6 pixels in FIG. 8 is obtained by copying the pixels located in the boundary region of the texture 302 having 4×4 pixels (FIG. 5B) to an area around the boundary region. The texture 502 having 6×6 pixels in FIG. 8 is obtained by copying the pixels located in the boundary region of the texture 304 having 4×4 pixels (FIG. 5B) to an area around the boundary region. This procedure of copying is explained in more detail below in connection with FIGS. 9 and 10.

By generating the pixels in the outermost rows and outermost columns of the texture to be stored in the second original image storing section 209 by such a copying procedure, the amount of data which is required to be transferred from the first original image storing section 207 to the second original image storing section 209 can be reduced, although the image quality is slightly less than that in the first example. Such a reduced amount of data contributes to reduction of the size of the circuit.

Hereinafter, the copying procedure performed by the original image storage controller 210 will be described in more detail.

Figure 9:
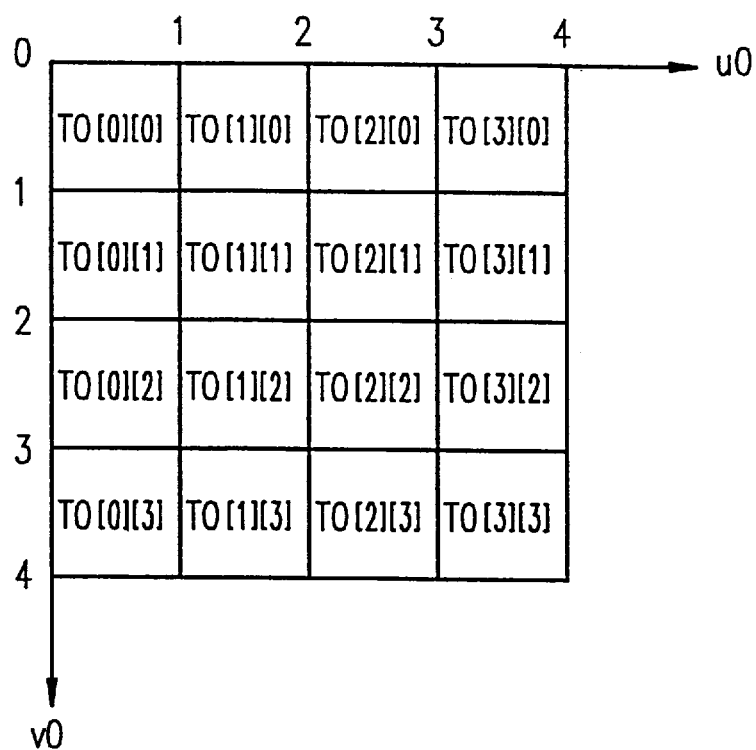
FIG. 9 is a view illustrating an example of a texture before division stored in the first original image storing section.

FIG. 9 shows a texture T0 which is a part of the texture stored in the first original image storing section 207. The texture T0 is to be mapped. In this example, the texture T0 includes 4×4 pixels, and the values of these pixels are stored in an array T0[i][j]. Herein, i=0, 1, 2, 3 and j=0, 1, 2, 3.

The original image storage controller 210 converts the texture T0 in FIG. 9 into a texture T1 shown in FIG. 10. In this example, the texture T1 includes 6×6 (=4+2)×(4+2)) pixels. The values of the pixels included in the texture T1 are stored in an array T1[i][j]. Herein, i=0, 1, 2, 3, 4, 5; and j=0, 1, 2, 3, 4, 5. The texture T1 is stored in the second original image storing section 209.

In a practical operation, conversion from the texture T0 into the texture T1 is performed using equation (7). When the size of the original texture T0 is 4×4 pixels, m=4 and n=4.

When $1 \leq i < m + 1$ and $1 \leq j < n + 1$ (7)
$T1[i][j] = T0[i - 1][j - 1]$ When $1 \leq i < m + 1$ and $j = 0$
$T1[i][0] = T0[i - 1][0]$ When $1 \leq i < m + 1$ and $j = n + 1$
$T1[i][n + 1] = T0[i - 1][n - 1]$ When $i = 0$ and $1 \leq j < n + 1$
$T1[0][j] = T0[0][j - 1]$ When $i = m + 1$ and $1 \leq j < n + 1$
$T1[m + 1][j] = T0[m - 1][j - 1]$
$T1[0][0] = T0[0][0]$
$T1[m + 1][0] = T0[m - 1][0]$
$T1[0][n + 1] = T0[0][n - 1]$
$T1[m + 1][n + 1] = T0[m - 1][n - 1]$ where the ranges of i and j respectively represent the coordinates (u1, v1) of T1; and m and n represent the size of the original texture T0.

Herein, (v0, v0) denotes a non-integer reference address (coordinates of which are not integers) with respect to the original texture T0, and (u1, v1) denotes a non-integer reference address with respect to the texture T1. (u1, v1) can be expressed by equation (8) by equation (7).

$$u1 = u0 + 1, \quad v1 = v0 + 1 \tag{8}$$

The address generator 208 generates the address shown in equation (9), and accesses the pixels of the texture to be stored in the second original image storing section 209 using the address. As a result, pixel data shown in equation (10) is input to the interpolator 204. In equation (9), the brackets "[]" represent a Gaussian symbol. In equation (10), the outer brackets "[]" represent an array, and the inner brackets "[]" represent a Gaussian symbol.

$$([u1-0.5]+0,[v1-0.5]+0), ([u1-0.5]+0,[v1-0.5]+1) ([u1-0.5]+1, [v1-0.5]+1), ([u1-0.5]+1, [v1-0.5]+0) \tag{9}$$

$$T1[[u1-0.5]+0], T1[[u1-0.5]+0][[v1-0.5]+1]T1[[u1-0.5]+1][[v1-0.5]+1][[v1-0.5]+0] \tag{10}$$

Based on a part of the pixel data shown in equation (10) and a part of the reference address (u1, v1) shown in equation (8), the interpolator 204 generates interpolation pixel data (P_gen) using equation (11). By supplying the texture T1 with the reference address (u1, v1) by the following procedure, P gen shown by equation (11) can be obtained as the interpolation pixel data for the texture T1.

$$\begin{aligned} P\_gen &= (1-p) \times (1-q) \times T1[[u1-0.5]+0][[v1-0.5]+0] + \\ &\quad (1-p) \times (q) \times T1[[u1-0.5]+0][[v1-0.5]+1] + \\ &\quad (p) \times (q) \times T1[[u1-0.5]+1][[v1-0.5]+1] + \\ &\quad (p) \times (1-q) \times T1[[u1-0.5]+1][[v1-0.5]+0] \\ p &= (u1+0.5) - [u1+0.5]q = (v1+0.5) - [v1-0.5] \end{aligned} \tag{11}$$

Next, interpolation data P_gen' which is obtained when a reference address (u0, v0) is given to the texture T0 will be described. From equation (4), the range for the reference address which can be processed by bilinear interpolation is obtained by equation (12). Data of four pixels required for interpolation is given by equation (13) (see FIG. 3). Accordingly, when the reference address (u0, v0) is given to the texture T0, P_gen' shown by equation (14) can be obtained as in the interpolation pixel data for the texture T0 (see equation (11)).

$$0.5 \leq u0 \leq 3.5(-m - 0.5), 0.5 \leq v0 \leq 3.5(-n - 0.5) \quad (12)$$

$$T0[[u0 - 0.5] + 0][[v0 - 0.5] + 0], T0[[u0 - 0.5] + 0][[v0 - 0.5] + 1] \quad (13)$$
$$T0[[u0 - 0.5] + 1][[v0 - 0.5] + 1], T0[[u0 - 0.5] + 1][[v0 - 0.5] + 0]$$

$$\begin{aligned} P\_gen' &= (1-p) \times (1-q) \times T0[[u0 - 0.5] + 0][[v0 - 0.5] + 0] + \quad (14) \\ &\quad (1-p) \times (q) \times T0[[u0 - 0.5] + 0][[v0 - 0.5] + 1] + \\ &\quad (p) \times (q) \times T0[[u0 - 0.5] + 1][[v0 - 0.5] + 1] + \\ &\quad (p) \times (1-q) \times T0[[u0 - 0.5] + 1][[v0 - 0.5] + 0] \\ p &= (u0 + 0.5) - [u0 + 0.5], q = (v0 + 0.5) - [v0 - 0.5] \end{aligned}$$

It is clear from equation (8) that p and q in equations (11) and (14) are identical with each other. From equation (15), pixel data in equation (10) are identical with the pixel data in equation (13). This means that the interpolation pixel data P gen in equation (11) is identical with interpolation pixel data P_gen' in equation (14) in the range shown by equation (12). Thus, the same interpolation data can be performed in the first and the second examples.

$$T1[[u1 - 0.5] + 0][[v1 - 0.5] + 0] = \quad (15)$$

$$T1[[u0 + 1 - 0.5] + 0][[v0 + 1 - 0.5] + 0] =$$
$$T0[[u0 - 0.5] + 0][[v0 - 0.5] + 0] =$$

$$(\because 0.5 \leq u0 \leq 3.5, 0.5 \leq v0 \leq 3.5)$$

$$T1[[u1 - 0.5] + 0][[v1 - 0.5] + 1] =$$

$$T0[[u0 - 0.5] + 0][[v0 - 0.5] + 1] =$$

$$(\because 0.5 \leq u0 \leq 3.5, 0.5 \leq v0 \leq 3.5)$$

$$T1[[u1 - 0.5] + 1][[v1 - 0.5] + 1] =$$

$$T0[[u0 - 0.5] + 1][[v0 - 0.5] + 1] =$$

$$(\because 0.5 \leq u0 \leq 3.5, 0.5 \leq v0 \leq 3.5)$$

$$T1[[u1 - 0.5] + 1][[v1 - 0.5] + 0] =$$

$$T0[[u0 - 0.5] + 1][[v0 - 0.5] + 0] =$$

$$(\because 0.5 \leq u0 \leq 3.5, 0.5 \leq v0 \leq 3.5)$$

Now, interpolation when a reference address (u0, v0) is outside the range shown by equation (12) will be described. Herein, the reference address (u0, v0) is in the range shown by equation (16) as an example.

$$0.5 \leq u0 \leq 3.5(=m-0.5), 0 \leq v0 < 0.5 \quad (16)$$

It is impossible to provide four textures required for interpolation by referring to the original texture T0. However, equation (10) can be used for interpolation as texture data by the pixel value supplier 203 in the system 100 according to the present invention. The texture data is expressed by equation (17).

$$T1[[u1 - 0.5] + 0][[v1 - 0.5] + 0] = \quad (17)$$

$$T1[[u0 + 1 - 0.5] + 0][[v0 + 1 - 0.5] + 0] =$$

$$T1[[u0 + 1 - 0.5] + 0][0 + 0] (\because 0 \leq v0 < 0.5) = T0[[u0 - 0.5] + 0][0]$$

$$T1[[u1 - 0.5] + 0][[v1 - 0.5] + 1] =$$

$$T1[[u0 + 1 - 0.5] + 0][[v0 + 1 - 0.5] + 1] =$$

$$T1[[u0 + 1 - 0.5] + 0][0 + 1] (\because 0 \leq v0 < 0.5) = T0[[u0 - 0.5] + 0][0]$$

$$T1[[u1 - 0.5] + 1][[v1 - 0.5] + 1] =$$

-continued $$T1[[u0 + 1 - 0.5] + 1][[v0 + 1 - 0.5] + 1] =$$

$$T1[[u0 + 1 - 0.5] + 1][0 + 1] (\because 0 \leq v0 < 0.5) = T0[[u0 - 0.5] + 1][0]$$

$$T1[[u1 - 0.5] + 1][[v1 - 0.5] + 0] =$$

$$T1[[u0 + 1 - 0.5] + 1][[v0 + 1 - 0.5] + 0] =$$

$$T1[[u0 + 1 - 0.5] + 1][0 + 0] (\because 0 \leq v0 < 0.5) = T0[[u0 - 0.5] + 1][0]$$

The interpolator 204 generates interpolation pixel data (P_gen) based on the texture data shown by equation (17) and a reference address (u1, v1). From equation (11), the interpolation pixel data (P_gen) is expressed by equation (18).

$$\begin{aligned} P\_gen &= (1-p) \times (1-q) \times T1[[u1 - 0.5] + 0][[v1 - 0.5] + 0] + \quad (18) \\ &\quad (1-p) \times (q) \times T1[[u1 - 0.5] + 0][[v1 - 0.5] + 1] + \\ &\quad (p) \times (q) \times T1[[u1 - 0.5] + 1][[v1 - 0.5] + 1] + \\ &\quad (p) \times (1-q) \times T1[[u1 - 0.5] + 1][[v1 - 0.5] + 0] \\ p &= (u1 + 0.5) - [u1 + 0.5]q = (v1 + 0.5) - [v1 + 0.5] \\ &= (1-p) \times (1-q) \times T0[[u0 - 0.5] + 0][0] + \\ &\quad (1-p) \times (q) \times T0[[u0 - 0.5] + 0][0] + \\ &\quad (p) \times (q) \times T0[[u1 - 0.5] + 1][0] + \\ &\quad (p) \times (1-q) \times T0[[u1 - 0.5] + 1][0] \\ &= (1-p) \times T0[[u0 - 0.5] + 0][0] + \\ &\quad (p) \times T0[[u1 - 0.5] + 1][0] \end{aligned}$$

Thus, interpolation of the original texture T0 is performed by two pixels which are adjacent to each other and interposing the reference address. Equation (16) shows an area in the vicinity of a boundary region on the texture T0. Even when the reference address is in the vicinity of another boundary region outside the range expressed by equation (16), interpolation is performed in a similar manner.

Thus, in the first and the second examples, bilinear interpolation is performed in the range indicated by equation (19). The size of the texture is m×n pixels, and the sampling point is the center of the pixel. Regardless of the position of a reference address with respect to the texture, interpolation can be performed by only one interpolation procedure (see equation (11)).

$$0.0 \leq u \leq m, \ 0.0 \leq v \leq n \quad (19)$$

As is described above, the synthesizer 205 generates an image by equation (6).

Hereinafter, texture mapping in the case where one texture is divided into a plurality of textures will be described.

Figure 11:
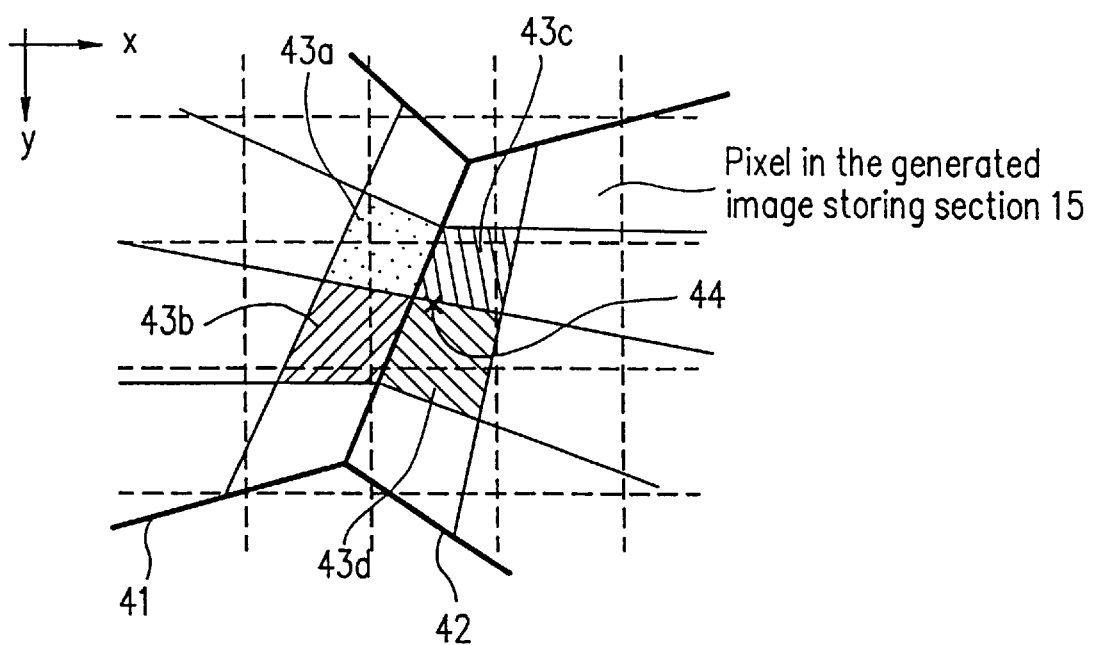
FIG. 11 is a view illustrating the relationship among pixels of a generated image stored in the generated image storing section, a polygon to be drawn, and pixels of a texture to be mapped to the polygon.

FIG. 11 illustrates the relationship between each of a plurality of pixels of a generated image stored in the generated image storing section 206, a polygon to be drawn, and each of a plurality of pixels of a texture to be mapped to the polygon. In FIG. 11, the dashed lines represent pixels stored in the generated image storing section 206; the thick solid lines represent the polygon to be drawn; and the thin solid lines represent pixels of the texture to be mapped to the polygon.

As is shown in FIG. 11, a polygon 41 and a polygon 42 are in contact with each other. In this example, a texture 0 is to be mapped to the polygon 41, and a texture 1 is to be mapped to the polygon 42. The textures 0 and 1 are obtained by the division of one texture. The texture 0 includes a pixel 43a and a pixel 43b. The pixel 43a has a pixel value a, and the pixel 43b has a pixel value b. The texture 1 includes a pixel 43c and a pixel 43d. The pixel 43c has a pixel value c, and the pixel 43d has a pixel value d. A pixel 44, which is represented by "×" is the pixel to which interpolation pixel data is applied by the generated image storing section 206.

The interpolator 204 generates interpolation pixel data based on the pixel values a, b, c and d, and applies the interpolation pixel data to the pixel 44.

Figure 12:
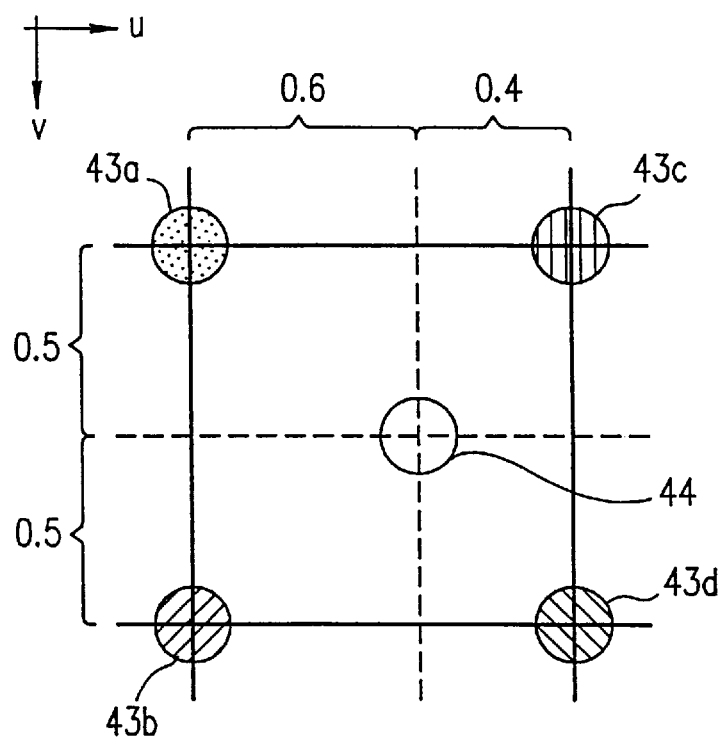
FIG. 12 is a view illustrating an arrangement of a pixel to which interpolation pixel data is applied and pixels in the vicinity thereof.

FIG. 12 illustrates an arrangement of the pixel 44, the pixels 43a and 43b of the texture 0, and the pixels 43c and 43d of the texture 1 shown in FIG. 11. In FIG. 12, the pixel 44 is shown in the state of being projected in the second original image storing section 209, and the coordinates thereof are not integers.

In the case of the arrangement shown in FIG. 12, interpolation pixel data expressed by equation (20) should be obtained based on the pixel values a, b, c and d.

$$0.2 \times a + 0.2 \times b + 0.3 \times c + 0.3 \times d \tag{20}$$

The interpolation pixel data expressed by equation (20) is obtained in the following manner based on the textures 0 and 1. In the following explanation, after the texture 0 is mapped to the polygon 41, the texture 1 is mapped to the polygon 42. The procedure is the same even if the mapping is performed in the opposite order.

First, the interpolator 204 generates interpolation pixel data (P_gen0) for the texture 0. The interpolation pixel data (P_gen0) is obtained by equation (11). As a result, equation (21) is obtained. In the case where the contribution ratio (the ratio of the area of the polygon 0 with respect to the area of the pixel 44) is 0.4, the attribute value ($\alpha 0\_gen$) is expressed by equation (22). A value of the pixel 44 to be stored in the generated image storing section 206, namely, (P_acc_out) is found by equation (6) based on the interpolation pixel data (P_gen0) and the attribute value ($\alpha 0\_gen$). As a result, equation (23) is obtained.

$$P0\_gen = 0.5 \times a + 0.5 \times b \tag{21}$$

$$\alpha 0\_gen = 0.4 \tag{22}$$

$$P\_acc\_out = P0\_gen \times 0.4 \; \alpha\_acc\_out = \alpha 0 \times gen = 0.4 \tag{23}$$

Next, the interpolator 204 generates interpolation pixel data (P_gen1) for the texture 1. The interpolation pixel data is obtained by equation (11). As a result, equation (24) is obtained. In the case where the contribution ratio (the ratio of the area of the polygon 1 with respect to the area of the pixel 44) is 0.6, the attribute value ($\alpha 1\_gen$) is expressed by equation (25). A value of the pixel 44 to be stored in the generated image storing section 206, namely, (P_acc_out) is found by equation (6) based on the interpolation pixel data (P_gen1), the attribute value ($\alpha 1\_gen$), the value P_acc_in, and the value $\alpha\_acc\_in$. As a result, equations (26) and (27) are obtained.

$$P1\_gen = 0.5 \times c + 0.5 \times d \tag{24}$$

$$\alpha 1\_gen = 0.6 \tag{25}$$

$$\begin{aligned} P\_acc\_out &= P\_acc\_in + \alpha\_gen \times P\_gen \\ &= P0\_gen \times 0.4 + \alpha 1\_gen \times P1\_gen \\ &= 0.2 \times a + 0.2 \times b + 0.3 \times c \, 0.3 \times d \end{aligned} \tag{26}$$

$$\begin{aligned} \alpha\_acc\_out &= \alpha 0\_acc\_in + \alpha 1\_gen \\ &= 0.4 + 0.6 \\ &= 1.0 \end{aligned} \tag{27}$$

Equation (26) is identical with equation (20). From this, it is appreciated that ideal interpolation can be performed by texture mapping even in the case where one texture is divided into a plurality of textures.

Division of one texture into a plurality of textures does not generate discontinuity between texture or polygons. Accordingly, texture mapping for generating a high quality image can be provided.

Where P is pixel data as a final product, n is the number of interpolation pixels regarding the pixel data, P_gen(i) is interpolation pixel data of each of the "n" number of interpolation pixels, and $\alpha\_gen(i)$ is the contribution ratio of the "n" number of interpolation pixels (an area shared by a pixel on the screen and an interpolation pixel to be generated under the condition that each pixel is a square having a side of 1; the sum of $\alpha\_gen(i)$ is 1.0 as is shown by equation (28), and P is obtained by equation (29).

$$\Sigma \alpha\_gen(i) = 1.0 \quad i = 0, 1 \ldots n-1 \tag{28}$$

$$P = \Sigma P\_gen(i) \quad i = 0, 1 \ldots n-1 \tag{29}$$

From equations (7), (11), (28) and (29), it is appreciated that the pixel data P as a final product can be generated by reflecting the texture data corresponding to the polygon regarding the pixel. In other words, pixel data of textures reflected between adjacent polygons can be referred to by each other. Thus, discontinuity which is generated between polygons in a conventional interpolation apparatus is eliminated. Accordingly, even independent textures can be processed as continuous textures as long as such textures are mapped to adjacent polygons. For this reason, high quality texture mapping is performed.

The sampling point with respect to the texture is the center of the pixel in this example, but can be determined arbitrarily.

Example 3

In the second example, the texture 501 which is larger than the texture 302 in the first example by one pixel along four sides thereof is generated by copying the pixels located in a boundary region of the texture 302 to an area around the boundary region. The same effect is achieved by performing different processing by the address generator 208 while storing the texture 302 in the second original image storing section 209. In the case where the texture coordinates (u, v) generated by the uv-DDA processing section 213 are located in a boundary region of the texture 302, the address generator 208 is controlled not to generate an address beyond the area of the texture 302. In this manner, a memory area required for the second original image storing section 209 can be reduced. Such processing will be described in a third example.

In the third example, the system 100 and the rendering processor 3 have the same structure as in the second example, and the description thereof will be omitted. The interpolation in the third example is different from the interpolation in the second example in the processing performed by the original image storage controller 210 and the address generator 208.

The original image storage controller 210 reads a texture to be mapped (for example, a 4×4 pixel texture) from the first original image storing section 207, and then stores the texture in the second original image storing section 209.

In this example, the texture T0 shown in FIG. 9 is stored in the second original image storing section 209. The texture T0 includes 4×4 pixels, and the values of the pixels of the texture T0 are stored in an array T0 [i][j]. Herein, i=0, 1, 2, 3 and j=0, 1, 2, 3.

The address generator 208 supplies a reference address (u0, v0) to the texture 0 stored in the second original image storing section 209. In the case where the reference address (u0, v0) is in the range shown by equation (12), the interpolator 204 can obtain pixel data required for interpolation from the second original image storing section 209. As is described above, the pixel data required for interpolation is expressed by equation (13).

In the case where the reference address (u0, v0) is expressed by equation (30), texture mapping is performed in the following manner. The reference address shown by equation (30) is located in the range expressed by equation (16) described in the second example.

$$u0=2.1, v0=0.3 \quad (30)$$

Figure 13:
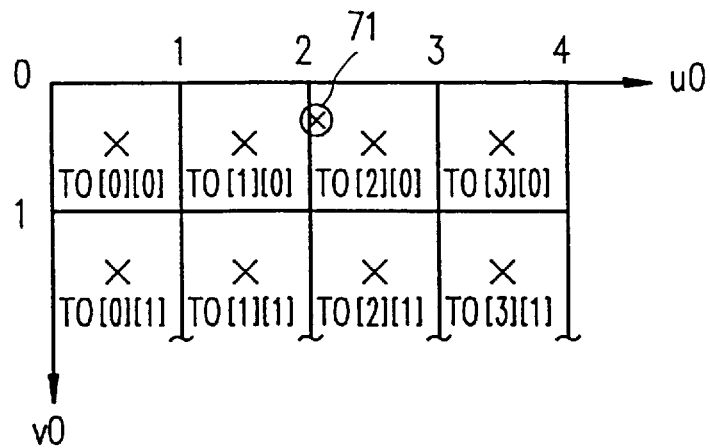
FIG. 13 is a view illustrating a point of a reference address in the texture before division.

FIG. 13 shows a position of the reference address (u0, v0) expressed by equation (30) by reference numeral 71. Symbols "×" other than the point 71 indicate sampling points with respect to the texture 0.

Figure 14:
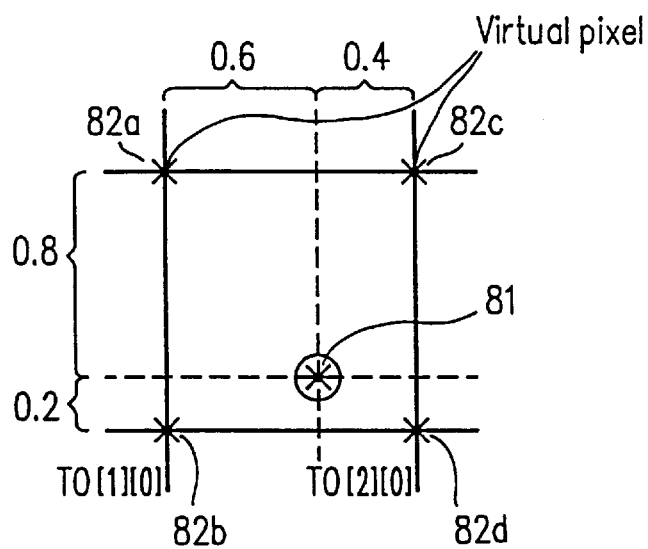
FIG. 14 is an enlarged view of the reference address and the vicinity thereof shown in FIG. 13.

FIG. 14 is an enlarged view of the vicinity of the reference address (u0, v0) shown in FIG. 13. The reference address (u0, v0) is indicated by reference numeral 81, and four pixels around the reference address 81 are indicated by reference numerals 82a through 82d. The pixels 82b and 82d are pixels of the texture 0 which actually exist, and respectively have pixel values T0[1][0] and T0[2][0]. The pixels 82a and 82c are virtual pixels.

In the case where the reference address (u0, v0) is located in a boundary region of the texture 0, the address generator 208 generates an address for obtaining pixel data which is required for interpolation (see equations (13) and (31)).

$$T0[1][0], T0[1][0], T0[2][0], T0[2][0] \quad (31)$$

The pixel data expressed by equation (31) is identical with the pixel data which is obtained by giving the reference address (u1, v1) to the texture T1 described in the second example. This means that the same effect as that in the first and the second examples is achieved by altering the processing of the address generator 208 without generating the texture T1.

Hereinafter, the address generator 208 in the third example will be described in detail.

Figure 15:
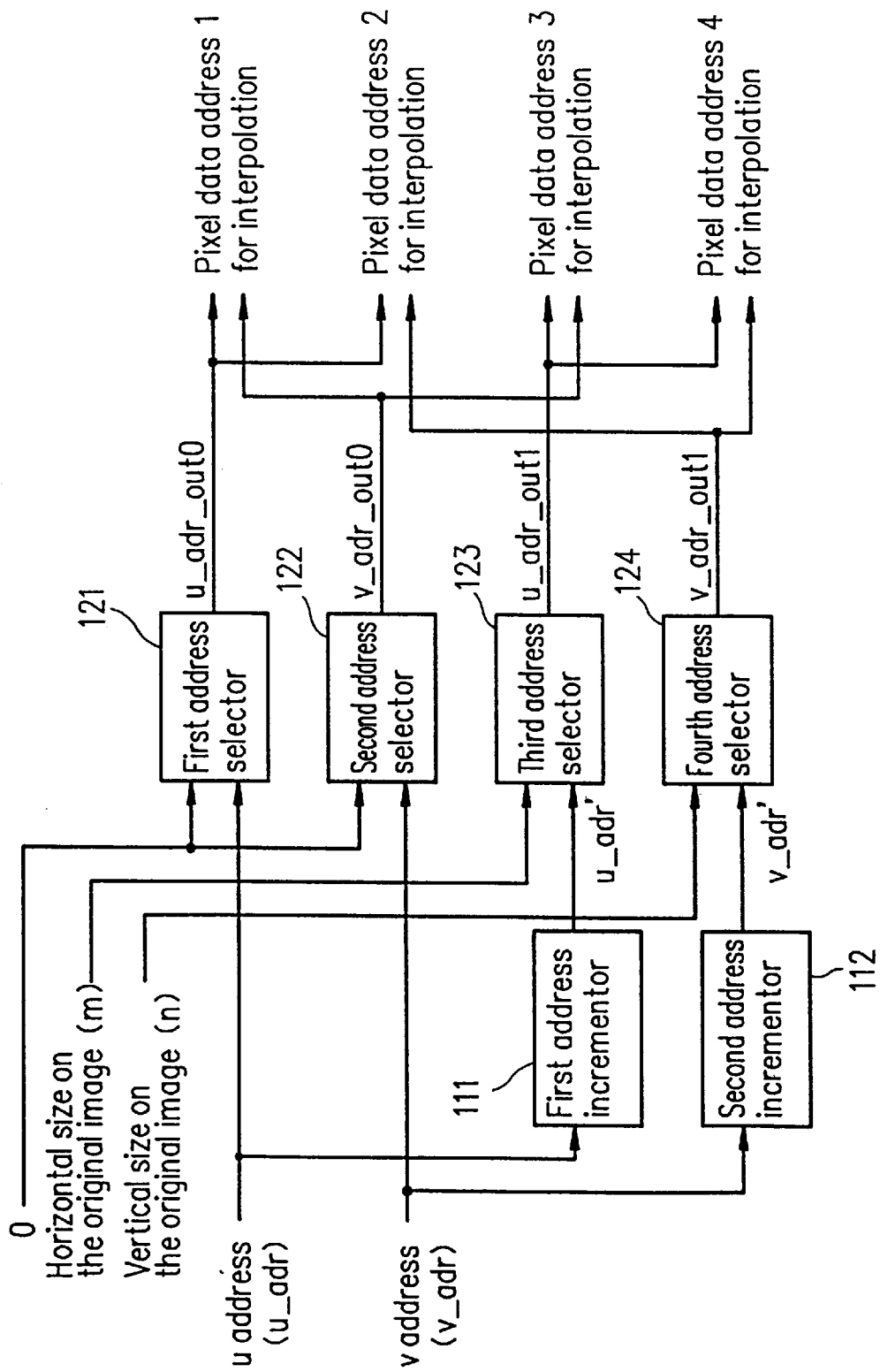
FIG. 15 is a block diagram illustrating a structure of an address generator of the system shown in FIG. 1.

FIG. 15 shows a structure of the address generator 208 in this example. The address generator 208 is supplied with a two-dimensional address including a u address (u_adr) and a v address (v_adr).

The address generator 208 includes address incrementors 111 and 112 and address selectors 121 through 124.

The address incrementor 111 increments the input u address (u_adr) by 1 and outputs an address indicating the result (u_adr'). The address incrementor 112 increments the input v address (v_adr) by 1 and outputs an address indicating the result (v_adr').

The address selector 121 compares the u_adr and 0 and selectively outputs u_adr or 0 as u_adr_out_0. The address selector 122 compares the v_adr and 0 and selectively outputs v_adr or 0 as v_adr_out0. The address selector 123 compares u_adr' and the horizontal size m of the original image (4 in this example) and selectively outputs u_adr' or m as u_adr_out1. The address selector 124 compares v_adr' and the vertical size n of the original image (4 in this example) and selectively outputs v_adr' or n as v_adr_out1.

In the case when the reference address expressed by equation (30) is input to the address generator 208, u_adr and v_adr are expressed by equation (32).

$$u\_adr=[u0-0.5]=[2.1-0.5]=1, v\_adr=[v0-0.5]=[0.3-0.5]=-1 \quad (32)$$

An input to the address incrementor 111 (u_adr) and an input to the address incrementor 112 (v_adr) have the relationship expressed by equation (33) with an output from the address incrementor 111 (u_adr') and an output from the address incrementor 112 (v_adr').

$$u\_adr'=u\_adr+1, v\_adr'=v\_adr+1 \quad (33)$$

The output values u_adr_out0, v_adr_0, u_adr_out1 and v_adr_out1 are expressed by equation (34), using the following functions regarding the address selectors. Namely, "sel1" is a function defining the operation of the address selector 121; "sel2" is a function defining the operation of the address selector 122; "sel3" is a function defining the operation of the address selector 123; and "sel4" is a function defining the operation of the address selector 124.

$$\begin{aligned}
u\_adr\_out0 &= sel1(u\_adr, 0) \quad (34) \\
&= sel1(1, 0) \\
&= 1 (\because u\_adr > 0) \\
v\_adr\_out0 &= sel2(v\_adr, 0) \\
&= sel2(-1, 0) \\
&= 0 (\because v\_adr < 0) \\
u\_adr\_out1 &= sel3(u\_adr + 1, 0) \\
&= sel3(2, 0) \\
&= 2 (\because u\_adr < 4 \\
&\quad (=\text{horizontal size of the original image})) \\
v\_adr\_out1 &= sel4(v\_adr + 1, 0) \\
&= sel4(0, 0) \\
&= 0 (\because v\_adr < 4 \\
&\quad (=\text{vertical size of the original image}))
\end{aligned}$$

The address generator 208 outputs (u_adr_out0, v_adr_out0) as pixel data address 1 for interpolation, (u_adr_out0, v_adr_out1) as pixel data address 2 for interpolation, (u_adr_out1, v_adr_out0) as pixel data address 3 for interpolation, and (u_adr_out1, v_adr_out1) as pixel data address 4 for interpolation.

Thus, the address generator 208 outputs four pixel data addresses for interpolation to the second original image storing section 209. The four addresses are expressed by equation (35).

$$\begin{aligned}
&\text{Pixel data address 1: (u\_adr\_out0, v\_adr\_out0) = (1,0)} \quad (35)\\
&\text{Pixel data address 2: (u\_adr\_out0, v\_adr\_out1) = (1,0)}\\
&\text{Pixel data address 3: (u\_adr\_out1, v\_adr\_out0) = (2,0)}\\
&\text{Pixel data address 4: (u\_adr\_out1, v\_adr\_out1) = (2,0)}
\end{aligned}$$

As is described above, an address for referring to the pixel data (equation (35)) can be generated by the address generator 208 shown in FIG. 15. This means the pixel 82b is addressed instead of the pixel 82a, and the pixel 82d is addressed instead of the pixel 82c. As a result, the pixel value supplier 203 supplies a prescribed number of pixel data to the interpolator 204 regardless of whether or not the reference address is located in a boundary region of the texture. Thus, the interpolator 204 is allowed to compute the interpolation pixel data (P_gen) by equation. (11) (see equation (36)).

$$\begin{aligned} P\_gen &= 0.4 \times 0.2 \times T0[1][0] + \\ &\quad 0.4 \times 0.8 \times T0[1][0] + \\ &\quad 0.6 \times 0.8 \times T0[2][0] + \\ &\quad 0.6 \times 0.2 \times T0[2][0] \\ &= 0.4 \times T[1][0] + \\ &\quad 0.6 \times T0[2][0] \end{aligned} \quad (36)$$

$(\because p = (u0 + 0.5) - [u0 + 0.5] = 2.6 - [2.6] =$
$0.6 q = (v0 + 0.5) - [v0 + 0.5] = 0.8 - [0.8] = 0.8)$ The following procedure is the same as in the second example. In the third example, the address generator 208 generates an address as if the texture T1 was existent.

In this example, high quality and high-speed texture mapping as in the second example is performed. Compared to the texture mapping in the second example, conversion of the texture performed by the original image storage controller 210 is eliminated, and thus less memory capacity is required for the second original image storing section 209.

Example 4

In the second example, the texture 501 which is larger than the texture 302 in the first example by one pixel along four sides thereof is generated by copying the pixels located in a boundary region of the texture 302 to an area around the boundary region. The same effect is achieved by performing different processing by the interpolator 204 while storing the texture 302 in the second original image storing section 209. In the case where the number of pixel data input to the interpolator 204 is smaller than the number of pixel data required for interpolation (for example, smaller than 4), an interpolation data generator 93a is provided for generating pixel data required for interpolation based on the input interpolation pixel data. Since conversion of the texture by the original image storage controller 210 is eliminated, less memory capacity is required for the second original image storing section 209. Such processing will be described in a fourth example.

In the fourth example, the system 100 and the rendering processor 3 have the same structure as in the second example, and the description thereof will be omitted. The interpolation in the fourth example is different from the interpolation in the second example in the processing performed by the original image storage controller 210 and the interpolator 204.

The original image storage controller 210 reads a texture to be mapped (for example, a 4×4 pixel texture) from the first original image storing section 207, and then stores the texture in the second original image storing section 209.

In this example, the texture T0 shown in FIG. 9 is stored in the second original image storing section 209. The texture T0 includes 4×4 pixels, and the values of the pixels of the texture T0 is stored in a sequence T0[i][j]. Herein, i=0, 1, 2, 3 and j=0, 1, 2, 3.

Figure 16:
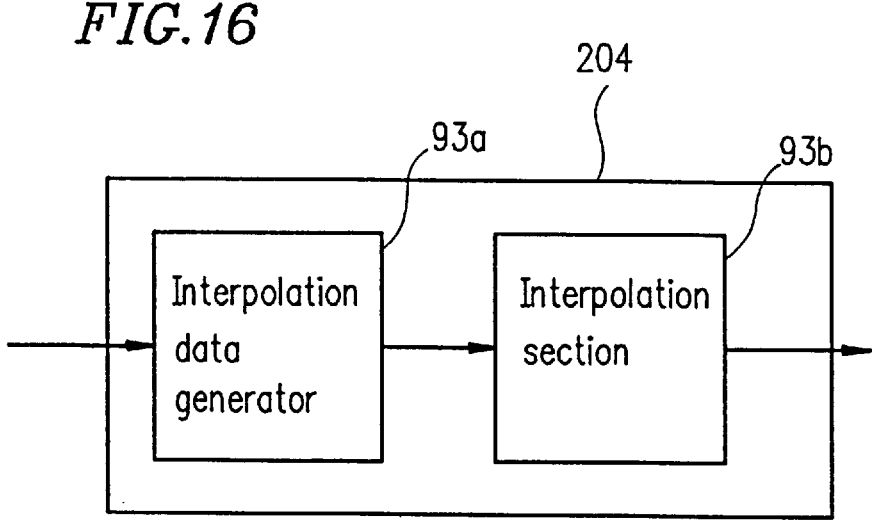
FIG. 16 is a block diagram illustrating a structure of an interpolator of the system shown in FIG. 1.

FIG. 16 shows a structure of the interpolator 204 in this example. The interpolator 204 includes an interpolation data generator 93a and an interpolation section 93b.

Hereinafter, the interpolation data generator 93a and an interpolation section 93b will be described. In this example, the texture sampling is performed at the center of the pixel, and the texture to be mapped includes 4×4 pixels.

In the case where the reference address (u0, v0) given to the texture T0 which is stored in the second original image storing section 209 by the address generator 208 is in the range expressed by equation (12), four pixel data are input to the interpolation data generator 93a. Four is the appropriate number of pixels which is required by bilinear interpolation. Accordingly, the interpolation data generator 93a outputs the four pixel data to the interpolation section 93b without any processing. The interpolation section 93b executes bilinear interpolation. The operation of the interpolation section 93b is the same as the operation of the interpolator 204 in the first through third examples.

In the case where the reference address (u0, v0) is outside the range expressed by equation (12), the number of pixel data input to the interpolation data generator 93a is smaller than the number required for bilinear interpolation. In this case, the interpolation data generator 93a generates the lacking number of pixel data to send four pixel data to the interpolation section 93b.

Texture mapping is performed in the following manner when the reference address (u0, v0) is expressed by equation (30). The reference address (u0, v0) is in the range of equation (16) described in the second example.

Since the address generator 208 gives the reference address (u0, v0) to the texture T0 stored in the second original image storing section 209, the interpolation data generator 93a is supplied with pixel data shown by equation (37). Among four data shown by equation (37), the two pixel data shown by equation (38) are improper or non-existent. Based on the values of the reference address (u0, v0) and the size of the texture (4×4 pixels), the interpolation data generator 93a recognizes that the two pixel data in equation (38) are improper.

$$T0[1][-1], T0[1][0], T0[2][0], T0[2][-1] \quad (37)$$

$$T0[1][-1], T0[2][-1] \quad (38)$$

$$T0[1][0], T0[2][0] \quad (39)$$

In the case where the pixel data input to the interpolation data generator 93a include improper pixel data, the interpolation data generator 93a outputs proper pixel data to the interpolation section 93b instead of the improper data. For example, pixel data shown in equation (39) are output instead of the pixel data in equation (38). The interpolation section 93b performs interpolation based on the input proper pixel data. The data obtained by such interpolation are identical with the data shown by equation (36).

The number of proper pixel data input to the interpolation data generator 93a is four, two or one. The pixel data required for interpolation is determined by the behavior of the values of the reference address (u0, v0). It would be easily understood from this by those skilled in the art that the interpolation data generator 93a can be formed of a simple multiplexer.

The procedure after the interpolation by the interpolation section 93b is the same as in the second example.

Example 5

In a fifth example, the system 100 and the rendering processor 3 have the same structure as in the first example, and the description thereof will be omitted. The interpolation in the fifth example is different from the interpolation in the first example in the processing performed by the original image storage controller 210.

FIG. 17 shows an example of textures 503 and 504 to be stored in the second original image storing section 209. The original image storage controller 210 reads a texture to be mapped (for example, a 4×4 pixel texture) from the first original image storing section 207. Next, the original image storage controller 210 inserts a fixed value which is determined in advance to pixels immediately outside all four sides of the texture, thereby generating a texture which is larger than the texture to be mapped by one pixel along each of four sides thereof (for example, a 6×6 pixel texture). Alternatively, the texture generated by the original image storage controller 210 can be larger than the texture for texture mapping by two or more pixels along each of four sides thereof. The texture generated in this manner is stored in the second original image storing section 209.

Figure 5B:
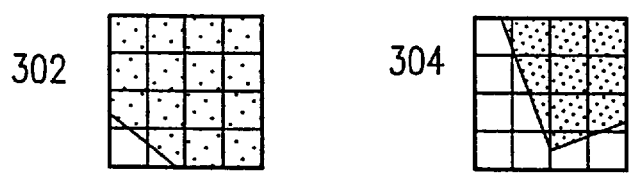
FIG. 5B is a view illustrating an example of textures, each of which is a part of the texture 301.
Figure 5C:
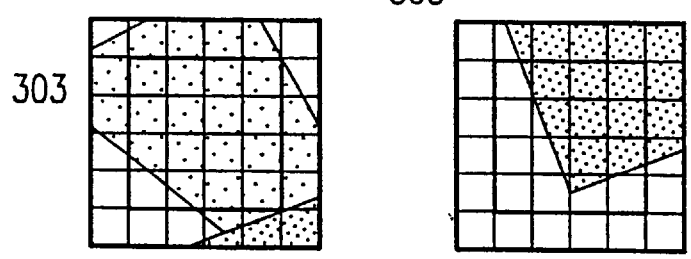
FIG. 5C is a view illustrating an example of textures, each of which is cut out from the texture 301.

For example, a texture 503 having 6×6 pixels shown in FIG. 17 is obtained by inserting such a fixed value to the pixels immediately outside all four sides of the 4×4 pixel texture 302 shown in FIG. 5B. A texture 504 having 6×6 pixels shown in FIG. 17 is obtained by inserting such a fixed value to the pixels immediately outside all four sides of the 4×4 pixel texture 304 shown in FIG. 5B. The fixed value is, for example, a pixel value 0 (representing black).

When the pixel value 0 is inserted to pixels around the texture to be mapped, the pixel value becomes closer to 0 from the inside of the polygon to an edge of the polygon. This means that the polygon edge is in the state of being filtered. By such filtering, aliasing of the polygon edge can be eliminated.

In the fifth example, interpolation and anti-aliasing of an edge can be performed in one step.

The fixed value to be inserted is not limited to 0, but an arbitrary value can be used.

Now, insertion of a fixed value performed by the original image storage controller 210 will be described in detail.

As in the second example, the original image storage controller 210 converts the original texture T0 into the texture T1. In the fifth example, the conversion is defined by equation (40). In equation (40), the pixel value representing black is 0.

$$\begin{aligned}
&\text{When } 1 \leq i < m+1 \text{ and } 1 \leq j < n+1 \\
&T1[i][j] = T0[i-1][j-1] \\
\\
&\text{When } 1 \leq i < m+1 \text{ and } j = 0 \\
&T1[i][0] = 0 \\
\\
&\text{When } 1 \leq i < m+1 \text{ and } j = n+1 \\
&T1[i][n+1] = 0 \\
\\
&\text{When } i = 0 \text{ and } 1 \leq j < n+1 \\
&T1[0][j] = 0 \\
\\
&\text{When } i = m+1 \text{ and } 1 \leq j < n+1 \\
&T1[m+1][j] = 0 \\
&T1[0][0] = 0 \\
&T1[m+1][0] = 0 \\
&T1[0][n+1] = 0 \\
&T1[m+1][n+1] = 0
\end{aligned} \quad (40)$$

where the ranges of i and j respectively represent the coordinates (u1, v1) of T1; and m and n are sizes of the original texture T0.

In the case where the reference address (u0, v0) is in the range expressed by equation (12), the result of interpolation is the same as in the second example. In the case where the reference address (u0, v0) is outside the range of equation (12), the result of interpolation is different from that in the second example. In the former case, interpolation is performed by using more pixels having a pixel value 0 (representing black) at the boundary region of the texture T0 than the center of the texture T0 (see equation (11)).

The procedure after the above-mentioned step is the same as in the second example. The pixel value of the edge of the polygon is used as reference for the vicinity of the boundary region of the texture. Finding such a pixel value is equivalent to smoothing the edge of the polygon.

The same effect is also achieved by performing a different procedure by the address generator 208 while storing the texture 302 in the second original image storing section 209. In the case where the texture coordinates (u, v) generated by the uv-DDA processing section 213 are located in a boundary region of the texture 302, the address generator 208 is controlled not to generate an address beyond the area of the texture 302. Instead, the address generator 208 refers to a specific register having the fixed value stored therein. In this manner, a memory area required for the second original image storing section 209 can be reduced.

Further, by inserting a pixel value indicating the background color of a texture of a subject for which the polygon is to be drawn into pixels immediately outside all four sides of the texture 302, anti-aliasing against high-quality background can be realized.

In the above examples, four pixels located in the vicinity of the reference address are used for interpolation, but the number of pixels used for interpolation is not limited to four.

Figure 18:
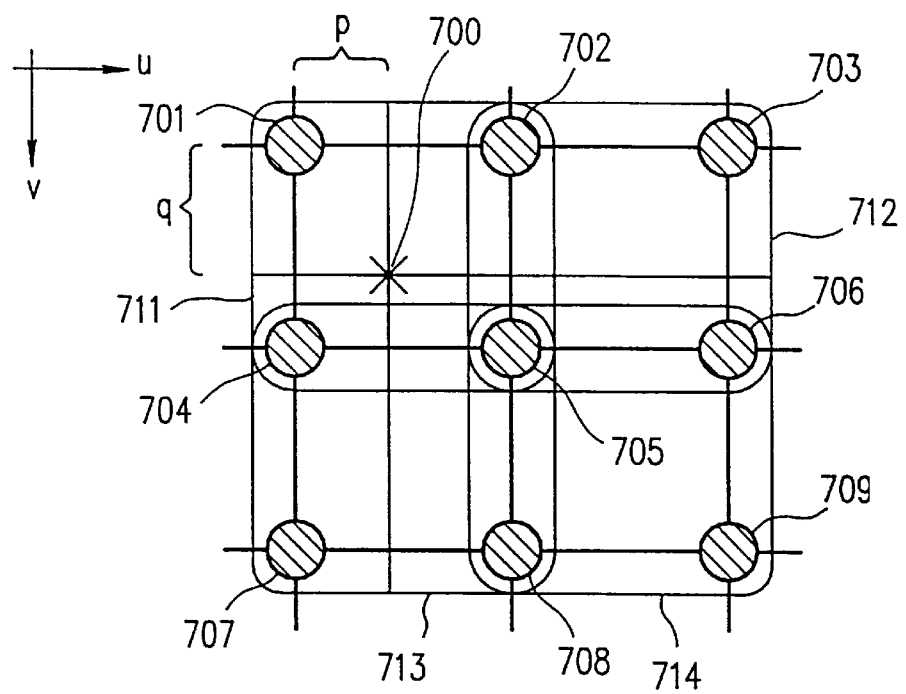
FIG. 18 is a view illustrating an arrangement of a reference address and nine pixels used for interpolation.

FIG. 18 shows an arrangement of nine pixels located in the vicinity of a reference address (indicated by a reference point 700) used for interpolation. The pixels are indicated by reference numerals 701 (pixel value: a), 702 (pixel value: b), 703 (pixel value: c), 704 (pixel value: d), 705 (pixel value: e), 706 (pixel value: f), 707 (pixel value: g), 708 (pixel value: h), and 709 (pixel value: i). The reference point 700 is surrounded by the pixels 701, 702, 704 and 705. The reference point 700 is away from the pixel 701 by distance p in the direction of u axis and by distance q in the direction of v axis. Here, $0 \leq p < 1$, $0 \leq q < 1$.

In this case, interpolation pixel data (P_gen) for the reference point 700 is found by equation (41). This means that interpolation is performed by processing the pixels 701 through 709, but a group of four at a time. The groups of four pixels are indicated in FIG. 18 as groups 711 through 714.

$$P\_gen = ( \tag{41}$$
$$+ (1-p) \times (1-q) \times a +$$
$$(p) \times (1-q) \times b +$$
$$(1-p) \times (q) \times d +$$
$$(p) \times (q) \times e +$$
$$(1-(-1+p)) \times (1-q) \times b +$$
$$((-1+p)) \times (1-q) \times c +$$
$$(1-(-1+p)) \times (q) \times e +$$
$$((-1+p)) \times (q) \times f +$$
$$(1-p) \times (1-(-1+q)) \times d +$$
$$(p) \times (1-(-1+q)) \times e +$$
$$(1-p) \times ((-1+q)) \times g +$$
$$(p) \times ((-1+q)) \times h +$$
$$(1-(-1+p)) \times (1-(-1+q)) \times e +$$
$$((-1+p)) \times (1-(-1+q)) \times f +$$
$$(1-(-1+p)) \times ((-1+q)) \times h +$$
$$((-1+p)) \times ((-1+q)) \times i$$
$$)/4$$
$$= ($$
$$(1-p) \times (1-q) \times a + 2 \times (1-q) \times$$
$$b + (-1+p) \times (1-q) \times c + (1-p) \times 2 \times d +$$
$$2 \times 2 \times e + (-1+p) \times 2 \times f + (1-p) \times$$
$$(-1+q) \times g + 2 \times (-1+q) \times h + (-1+p) \times$$
$$(-1+q) \times i$$
$$)/4$$

Figure 19:
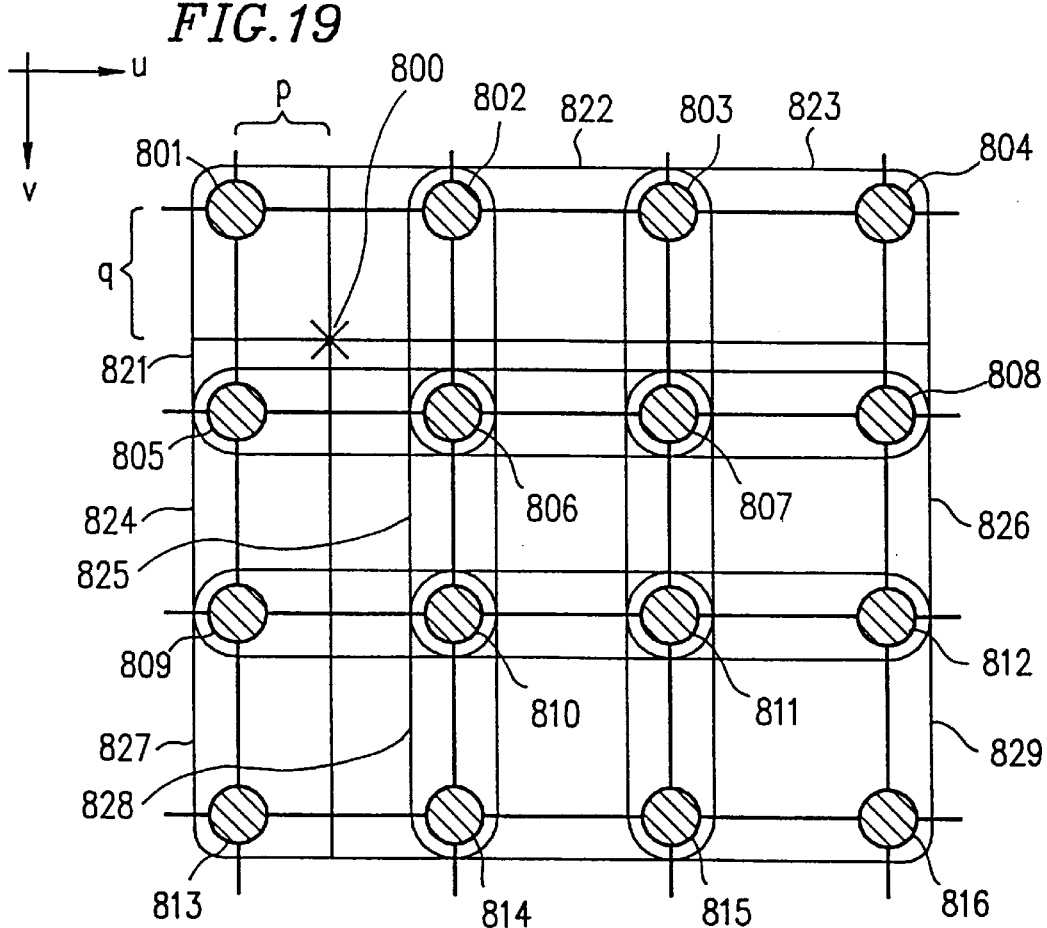
FIG. 19 is a view illustrating an arrangement of a reference address and 16 pixels used for interpolation.

FIG. 19 shows an arrangement of 16 pixels located in the vicinity of a reference address (indicated by a reference point 800) used for interpolation. The pixels are indicated by reference numerals 801 (pixel value: a), 802 (pixel value: b), 803 (pixel value: c), 804 (pixel value: d), 805 (pixel value: e), 806 (pixel value: f), 807 (pixel value: g), 808 (pixel value: h), 809 (pixel value: i), 810 (pixel value: J), 811 (pixel value: k), 812 (pixel value: 1), 813 (pixel value: m), 814 (pixel value: n), 815 (pixel value: o), and 816 (pixel value: r). The reference point 800 is surrounded by the pixels 801, 802, 805 and 806. The reference point 800 is away from the pixel 801 by distance p in the direction of u axis and by distance q in the direction of v axis. Here, $0 \leq p < 1$, $0 \leq q < 1$.

In this case, interpolation pixel data (P\_gen) for the reference point 800 is found by equation (42). This means that interpolation is performed by processing the pixels 801 through 816, but a group of four at a time. The groups of four pixels are indicated in FIG. 19 as groups 821 through 829.

$$P\_gen = (+ (1-p) \times (1-q) \times a + (p) \times (1-q) \times b + (1-p) \times \tag{42}$$
$$(q) \times e + (p) \times (q) \times f + (1-(-1+p)) \times (1-q) \times b + ((-1+p)) \times$$
$$(1-q) \times c + (1-(-1+p)) \times (q) \times f + ((-1+p)) \times (q) \times g +$$
$$(1-(-2+p)) \times (1-q) \times c + ((-2+p)) \times (1-q) \times d +$$
$$(1-(-2+p)) \times (q) \times g + ((-2+p)) \times (q) \times h + (1-p) \times$$
$$(1-(-1+q)) \times e + (p) \times (1-(-1+q)) \times f + (1-p) \times ((-1+q)) \times i +$$
$$(p) \times ((-1+q)) \times j + (1-(-1+p)) \times (1-(-1+q)) \times f + ((-1+p)) \times$$
$$(1-(-1+q)) \times g + (1-(-1+p)) \times ((-1+q)) \times j + ((-1+p)) \times$$
$$((-1+q)) \times k + (1-(-2+p)) \times (1-(-1+q)) \times g + ((-2+p)) \times$$
$$(1-(-1+q)) \times h + (1-(-2+p)) \times ((-1+q)) \times k + ((-2+p)) \times$$

-continued $$((-1+q) \times l + (1-p) \times (1-(-2+q)) \times i + (p) \times (1-(-2+q)) \times j +$$
$$(1-p) \times ((-2+q)) \times m + (p) \times ((-2)) \times n + (1-(-1+p)) \times$$
$$(1-(-2+q)) \times j + ((-1+p)) \times (1-(-2+q)) \times k +$$
$$(1-(-1+p)) \times ((-2+q)) \times n + ((-1+p)) \times ((-2+q)) \times o +$$
$$(1-(-1+p)) \times (1-(-2+q)) \times k + ((-2+p)) \times (1-(-2+q)) \times l +$$
$$(1-(-2+p)) \times ((-2+q)) \times o + ((-2+p)) \times ((-2+q)) \times r)/9 =$$
$$((1-p) \times (1-q) \times a + 2 \times (1-q) \times b + 2 \times (1-q) \times c + (-2+p) \times$$
$$(1-q) \times d + (1-p) \times 2 \times e + 2 \times 2 \times f + 2 \times 2 \times g + (-2+p) \times 2 \times$$
$$h + (1-p) \times 2 \times i + 2 \times 2 \times j + 2 \times 2 \times k + (-2+p) \times 2 \times l + (1-p) \times$$
$$(-2+q) \times m + 2 \times (-2+q) \times n + 2 \times (-2+q) \times o + (-2+p) \times$$
$$(-2+q) \times r)/9$$

In the above examples, bilinear interpolation is used, that is, a part of the reference address (u, v) with respect to the original image is input to the interpolator 204. Such input of only a part of the reference address (u, v) is not sufficient to maintain the amount of data when a larger range is to be interpolated. It is preferable to input the reference address (u, v) capable of calculating at least values of p and q with high precision.

According to the present invention, information concerning the appropriate number of pixels which is required by the interpolator can be provided, regardless of whether the reference address is located in the center region or the boundary region of the texture. In this manner, the entire area of the texture pattern can be interpolated by one interpolation step. Accordingly, different boundary and non-boundary types of exceptional interpolation, which are required by a conventional interpolating apparatus, are not necessary. As a result, the circuit can be reduced in size.

Elimination of the exceptional interpolation does not result in any deterioration. Rather, interpolation is performed uniformly over the entire area of the texture pattern. Accordingly, higher quality images can be generated.

Further according to the present invention, one texture can be divided into a plurality of textures, each of which can be processed independently. In such a case, for example, the texture before the division is stored in a first memory and the textures after the division are stored in a second memory. When the second memory operates at a higher speed than the first memory, the second memory also acts as a cache/buffer for the first memory. As a result, the texture to be mapped can be accessed at a higher speed, thus solving the problem of bus bottleneck.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An interpolation apparatus, comprising:
   first storage means for storing a texture including a plurality of pixels;
   information supply means for supplying information concerning a prescribed number of pixels included in the texture regardless of the position of a reference point with respect to the texture; and
   interpolation means for performing interpolation by calculating interpolation pixel data based on the information concerning the prescribed number of pixels, wherein information supply means includes:
cutting means for cutting, from the texture stored in the first storage means, a second texture which is larger than a first texture to be processed by at least one pixel around the boundary of the first texture;
second storage means for storing the second texture; and
address generation means for generating an address for accessing the pixels of the second texture stored in the second storage means in accordance with the reference point with respect to the first texture.

2. An interpolation apparatus according to claim 1, wherein the second texture is cut out so as to form a torus.

3. An interpolation apparatus according to claim 1, wherein the second storage means is a memory operating at a higher speed than the first storage means.

4. An interpolation apparatus, comprising:
first storage means for storing a texture including a plurality of pixels;
information supply means for supplying information concerning a prescribed number of pixels included in the texture regardless of the position of a reference point with respect to the texture; and
interpolation means for performing interpolation by calculating interpolation pixel data based on the information concerning the prescribed number of pixels,
wherein information supply means includes:
conversion means for converting the first texture including at least a part of the texture stored in the first storage means into a second texture which is larger than a first texture to be processed by at least one pixel around the boundary of the first texture;
second storage means for storing the second texture; and
address generation means for generating an address for accessing the pixels of the second texture stored in the second storage means in accordance with the reference point with respect to the first texture.

5. An interpolation apparatus according to claim 4, wherein the conversion means includes copying means for copying a pixel in a boundary region of the first texture into an area around the first texture.

6. An interpolation apparatus according to claim 4, wherein the conversion means includes insertion means for inserting a prescribed fixed value to an area around the first texture.

7. An interpolation apparatus according to claim 6, wherein the prescribed fixed value is a value representing black.

8. An interpolation apparatus according to claim 6, wherein the prescribed fixed value is a value representing a background color.

9. An interpolation apparatus according to claim 4, wherein the second storage means is a memory operating at a higher speed than the first storage means.

10. An interpolation method, comprising the steps of:
supplying information concerning a prescribed number of pixels included in a texture including a plurality of pixels regardless of the position of a reference point with respect to the texture; and performing interpolation by calculating interpolation pixel data based on the information concerning the prescribed number of pixels,
wherein the step of supplying information includes the steps of:
cutting, from the texture, a second texture which is larger than a first texture to be processed by at least one pixel around the boundary of the first texture; and
generating an address for accessing the pixels of the second texture in accordance with the reference point with respect to the first texture.

11. An interpolation method according to claim 10, wherein the second texture is cut out so as to form a torus.

12. An interpolation method, comprising the steps of:
supplying information concerning a prescribed number of pixels included in a texture including a plurality of pixels regardless of the position of a reference point with respect to the texture; and
performing interpolation by calculating interpolation pixel data based on the information concerning the prescribed number of pixels,
wherein the step of supplying information includes the steps of:
converting the first texture including a least a part of the texture into a second texture which is larger than a first texture to be processed by at least one pixel around the boundary of the first texture; and
generating an address for accessing the pixels of the second texture in accordance with the reference point with respect to the first texture.

13. An interpolation method according to claim 12, wherein the step of converting includes the step of copying a pixel in a boundary region of the first texture into an area around the first texture.

14. An interpolation method according to claim 12, wherein the step of converting includes the step of inserting a prescribed fixed value to an area around the first texture.

15. An interpolation method according to claim 14, wherein the prescribed fixed value is a value representing black.

16. An interpolation method according to claim 14, wherein the prescribed fixed value is a value representing a background color.

* * * * *